(12) United States Patent
Kadiri et al.

(10) Patent No.: US 11,477,687 B2
(45) Date of Patent: Oct. 18, 2022

(54) DELIVERY OF BROADCAST SERVICES USING DIFFERENT BROADCAST/MULTICAST RADIO BEARER MODES

(71) Applicant: QUALCOMM Incorporated, San Diego, CA (US)

(72) Inventors: Prasad Reddy Kadiri, San Diego, CA (US); Xipeng Zhu, San Diego, CA (US); Alberto Rico Alvarino, San Diego, CA (US); Gavin Bernard Horn, La Jolla, CA (US); Miguel Griot, La Jolla, CA (US); Umesh Phuyal, San Diego, CA (US); Kazuki Takeda, Minato-ku (JP); Le Liu, Fremont, CA (US)

(73) Assignee: Qualcomm Incorproated, San Diego, CA (US)

( * ) Notice: Subject to any disclaimer, the term of this patent is extended or adjusted under 35 U.S.C. 154(b) by 87 days.

(21) Appl. No.: 17/003,371

(22) Filed: Aug. 26, 2020

(65) Prior Publication Data
US 2021/0068003 A1    Mar. 4, 2021

Related U.S. Application Data

(60) Provisional application No. 62/893,634, filed on Aug. 29, 2019.

(51) Int. Cl.
*H04W 28/02* (2009.01)
*H04W 4/06* (2009.01)
(Continued)

(52) U.S. Cl.
CPC ....... *H04W 28/0263* (2013.01); *H04L 1/1812* (2013.01); *H04W 4/06* (2013.01);
(Continued)

(58) Field of Classification Search
CPC ......... H04W 28/2663; H04W 28/0268; H04W 28/10; H04W 76/12; H04W 76/11; H04W 4/06; H04L 1/1812
(Continued)

(56) References Cited

U.S. PATENT DOCUMENTS

| 2005/0111393 A1* | 5/2005 | Jeong | .................... H04W 68/00 |
| | | | 370/312 |
| 2008/0057961 A1* | 3/2008 | Sun | ..................... H04L 65/4076 |
| | | | 455/436 |

(Continued)

FOREIGN PATENT DOCUMENTS

| EP | 2892256 A1 | 7/2015 |
| WO | WO-2008046347 A1 | 4/2008 |
| WO | WO-2011160469 A1 | 12/2011 |

OTHER PUBLICATIONS

International Search Report and Written Opinion—PCT/US2020/048099—ISA/EPO—dated Oct. 9, 2020.

*Primary Examiner* — Candal Elpenord
(74) *Attorney, Agent, or Firm* — Holland & Hart LLP

(57) ABSTRACT

Methods, systems, and devices for wireless communication are described. Generally, the described techniques provide a base station receiving an indication from a core network to serve multicast/broadcast traffic to one or more UEs. The base station may select a radio bearer mode from a plurality of radio bearer modes for delivery of the multicast/broadcast traffic to at least one UE of the one or more UEs. For example, the base station may select a multicast/broadcast only mode, a mixed multicast/broadcast mode and unicast mode, or a unicast mode for service of the traffic. Dependent on the selected mode and/or quality of service, the base station may select a dedicated radio bearer (DRB) for communication of the traffic in a unicast mode (e.g., to a particular UE) or a multicast radio bearer (MRB) for communication of the traffic in a broadcast/multicast mode.

29 Claims, 17 Drawing Sheets

(51) Int. Cl.
    *H04W 28/10*    (2009.01)
    *H04W 76/12*    (2018.01)
    *H04W 76/11*    (2018.01)
    *H04L 1/18*    (2006.01)

(52) U.S. Cl.
    CPC ............ *H04W 28/10* (2013.01); *H04W 76/11* (2018.02); *H04W 76/12* (2018.02)

(58) Field of Classification Search
    USPC ........................................................ 370/312
    See application file for complete search history.

(56) References Cited

U.S. PATENT DOCUMENTS

| | | | |
|---|---|---|---|
| 2009/0040983 A1* | 2/2009 | Kim | H04W 28/24 |
| | | | 370/331 |
| 2009/0305712 A1 | 12/2009 | Franceschini et al. | |
| 2012/0275369 A1* | 11/2012 | Zhang | H04W 76/40 |
| | | | 370/312 |
| 2016/0119762 A1* | 4/2016 | Zhu | H04W 4/10 |
| | | | 370/312 |
| 2017/0374581 A1* | 12/2017 | Dao | H04W 76/40 |
| 2019/0379551 A1* | 12/2019 | Prasad | H04L 67/2842 |
| 2019/0394830 A1* | 12/2019 | Mildh | H04W 52/0258 |
| 2020/0267513 A1* | 8/2020 | Zhu | H04W 76/10 |
| 2020/0351980 A1* | 11/2020 | Talebi Fard | H04W 68/00 |

\* cited by examiner

DELIVERY OF BROADCAST SERVICES USING DIFFERENT BROADCAST/MULTICAST RADIO BEARER MODES

CROSS REFERENCE

The present Application for Patent claims the benefit of U.S. Provisional Patent Application No. 62/893,634 by KADIRI et al., entitled "DELIVERY OF BROADCAST SERVICES USING DIFFERENT BROADCAST/MULTICAST RADIO BEARER MODES," filed Aug. 29, 2019, assigned to the assignee hereof, and expressly incorporated by reference herein.

FIELD OF TECHNOLOGY

The following relates generally to wireless communication and more specifically to delivery of broadcast services using different broadcast/multicast radio bearer modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some radio access technologies (RATs) may support unicast communications, in which data may be transmitted to a single UE, and broadcast or multicast communications, in which data is transmitted to multiple UEs. These services may support different communication service verticals, such as vehicle to everything (V2X), industrial internet of things (I-IOT), extended reality (XR), etc. In some cases, a UE may be capable of receiving multicast/broadcast traffic and unicast traffic.

SUMMARY

The described techniques relate to improved methods, systems, devices, and apparatuses that support delivery of broadcast services using different broadcast/multicast radio bearer modes. Generally, the described techniques provide for selection of a radio bearer mode by a base station for service of multicast/broadcast traffic dependent on a quality of service for an indicated flow and/or a connected state of a user equipment (UE). For example, a base station may receive an indication from a core network to serve multicast/broadcast traffic to one or more UEs. The base station may select a radio bearer mode from a plurality of radio bearer modes for delivery of the multicast/broadcast traffic to at least one UE of the one or more UEs. For example, the base station may select a multicast/broadcast only mode, a mixed multicast/broadcast mode and unicast mode, or a unicast mode for service of the traffic. Dependent on the selected mode and/or quality of service, the base station may select a dedicated radio bearer (DRB) for transmission of the traffic in a unicast mode (e.g., to a particular UE) or a multicast radio bearer (MRB) for transmission of the traffic in a broadcast/multicast mode.

The described techniques further provide for a UE receiving a traffic indication that multicast/broadcast traffic is available for the UE. The UE may further receive a state indication that identifies whether the UE is to be in a connected mode state in order to receive the traffic. The UE may receive the traffic while in an IDLE, INACTIVE, or CONNECTED state consistent with the state indication. Further, a base station may configure the UE to be in the indicated state using various techniques, such as a wake up message, a broadcast page, a control channel message, etc. Thus, the base station may service the multicast/broadcast traffic in accordance with an indicated quality of service by configuring a UE to be in a corresponding state.

A method of wireless communication at a base station is described. The method may include receiving, at the base station, an indication from a core network to serve multicast/broadcast traffic to one or more user equipment (UEs), selecting a radio bearer mode from a set of radio bearer modes for delivery of the multicast/broadcast traffic to at least one UE of the one or more UEs, where the selecting is based on the indication, and transmitting the multicast/broadcast traffic to the at least one UE using the selected radio bearer mode.

An apparatus for wireless communication at a base station is described. The apparatus may include a processor, memory coupled with the processor, and instructions stored in the memory. The instructions may be executable by the processor to cause the apparatus to receive, at the base station, an indication from a core network to serve multicast/broadcast traffic to one or more user equipment (UEs), select a radio bearer mode from a set of radio bearer modes for delivery of the multicast/broadcast traffic to at least one UE of the one or more UEs, where the selecting is based on the indication, and transmit the multicast/broadcast traffic to the at least one UE using the selected radio bearer mode.

Another apparatus for wireless communication at a base station is described. The apparatus may include means for receiving, at the base station, an indication from a core network to serve multicast/broadcast traffic to one or more user equipment (UEs), selecting a radio bearer mode from a set of radio bearer modes for delivery of the multicast/broadcast traffic to at least one UE of the one or more UEs, where the selecting is based on the indication, and transmitting the multicast/broadcast traffic to the at least one UE using the selected radio bearer mode.

A non-transitory computer-readable medium storing code for wireless communication at a base station is described. The code may include instructions executable by a processor to receive, at the base station, an indication from a core network to serve multicast/broadcast traffic to one or more user equipment (UEs), select a radio bearer mode from a set of radio bearer modes for delivery of the multicast/broadcast traffic to at least one UE of the one or more UEs, where the selecting is based on the indication, and transmit the multicast/broadcast traffic to the at least one UE using the selected radio bearer mode.

In some examples of the method, apparatuses, and non-transitory computer-readable medium described herein, selecting the radio bearer mode may include operations, features, means, or instructions for identifying that the selected radio bearer mode may be one of a multicast/broadcast only mode or a mixed multicast/broadcast and unicast mode.

Some examples of the method, apparatuses, and non-transitory computer-readable medium described herein may further include operations, features, means, or instructions for identifying that the multicast/broadcast traffic may be associated with a quality of service flow type, determining a UE connection state for receiving the multicast/broadcast traffic, the UE connection state being determined based on the quality of service flow type associated with the multicast/broadcast traffic, and indicating to the at least one UE the UE connection state to be used in order to receive the multicast/broadcast traffic.

In some examples of the method, apparatuses, and non-transitory computer-readable medium described herein, the UE connection state may be one of a CONNECTED mode only state, or any of IDLE, INACTIVE, or CONNECTED mode states.

In some examples of the method, apparatuses, and non-transitory computer-readable medium described herein, identifying that the multicast/broadcast traffic may be associated with the quality of service flow type may include operations, features, means, or instructions for identifying a quality of service flow identifier associated with the quality of service flow type, and identifying that the UE connection state may be a CONNECTED mode only state based on the quality of service flow identifier.

In some examples of the method, apparatuses, and non-transitory computer-readable medium described herein, determining the UE connection state may include operations, features, means, or instructions for receiving a UE connection state indicator from the core network, and identifying that the UE connection state may be a CONNECTED mode only state based on the UE connection state indicator.

In some examples of the method, apparatuses, and non-transitory computer-readable medium described herein, selecting the radio bearer mode may include operations, features, means, or instructions for identifying that the selected radio bearer mode may be a mixed multicast/broadcast and unicast mode.

In some examples of the method, apparatuses, and non-transitory computer-readable medium described herein, receiving the indication to serve the multicast/broadcast traffic to the one or more UEs may include operations, features, means, or instructions for establishing a multicast/broadcast N3 tunnel with a multicast/broadcast user plane function (UPF) in order to receive the multicast/broadcast traffic from the multicast/broadcast UPF.

Some examples of the method, apparatuses, and non-transitory computer-readable medium described herein may further include operations, features, means, or instructions for transmitting the multicast/broadcast traffic to the at least one UE using a multicast/broadcast transmission based on the selected radio bearer mode being the mixed multicast/broadcast and unicast mode.

Some examples of the method, apparatuses, and non-transitory computer-readable medium described herein may further include operations, features, means, or instructions for transmitting the multicast/broadcast traffic to the at least one UE using a unicast transmission based on the selected radio bearer mode being the mixed multicast/broadcast and unicast mode.

Some examples of the method, apparatuses, and non-transitory computer-readable medium described herein may further include operations, features, means, or instructions for determining, based on the selected radio bearer mode being the mixed multicast/broadcast and unicast mode, that the at least one UE may be to be in a CONNECTED mode only state in order to receive the multicast/broadcast traffic.

Some examples of the method, apparatuses, and non-transitory computer-readable medium described herein may further include operations, features, means, or instructions for receiving an indication from the core network that the at least one UE may be to be in a CONNECTED mode only state in order to receive the multicast/broadcast traffic.

Some examples of the method, apparatuses, and non-transitory computer-readable medium described herein may further include operations, features, means, or instructions for transmitting a wake up message to trigger the at least one UE to transition to a CONNECTED mode state in order to receive the multicast/broadcast traffic, where the wake up message may be a per multicast/broadcast quality of service flow message.

Some examples of the method, apparatuses, and non-transitory computer-readable medium described herein may further include operations, features, means, or instructions for transmitting a broadcast page to trigger the at least one UE to transition to CONNECTED mode in order to receive the multicast/broadcast traffic.

Some examples of the method, apparatuses, and non-transitory computer-readable medium described herein may further include operations, features, means, or instructions for transmitting a service announcement to the at least one UE in a multicast/broadcast service area via a multicast control channel in order to trigger the at least one UE to transition to CONNECTED mode in order to receive the multicast/broadcast traffic.

In some examples of the method, apparatuses, and non-transitory computer-readable medium described herein, the multicast/broadcast service area encompasses a multicast/broadcast wake up area that may be based on an indication by a session management function (SMF).

Some examples of the method, apparatuses, and non-transitory computer-readable medium described herein may further include operations, features, means, or instructions for receiving, from a UE of the at least one UE, a HARQ feedback associated with the multicast/broadcast traffic.

Some examples of the method, apparatuses, and non-transitory computer-readable medium described herein may further include operations, features, means, or instructions for determining, based on the HARQ feedback, that the multicast/broadcast traffic may be to be retransmitted to the UE, determining to use one of a multicast/broadcast mode or a unicast mode for retransmitting the multicast/broadcast traffic to the UE, and retransmitting the multicast/broadcast traffic to the UE using the determined mode.

Some examples of the method, apparatuses, and non-transitory computer-readable medium described herein may further include operations, features, means, or instructions for switching from use of a multicast radio bearer to a dedicated radio bearer for retransmission of the multicast/broadcast traffic to the UE.

Some examples of the method, apparatuses, and non-transitory computer-readable medium described herein may further include operations, features, means, or instructions for switching from use of a dedicated radio bearer to a multicast radio bearer for retransmission of the multicast/broadcast traffic to the UE.

Some examples of the method, apparatuses, and non-transitory computer-readable medium described herein may further include operations, features, means, or instructions for indicating to the UE that retransmission of the multicast/broadcast traffic may be to be via a different type of radio bearer than was used for the transmission of the multicast/broadcast traffic.

Some examples of the method, apparatuses, and non-transitory computer-readable medium described herein may further include operations, features, means, or instructions for indicating to the UE may be via either a RRC message or a MAC control element (CE).

Some examples of the method, apparatuses, and non-transitory computer-readable medium described herein may further include operations, features, means, or instructions for receiving a packet data convergence protocol (PDCP) or RLC status feedback message from a UE of the at least one UE.

In some examples of the method, apparatuses, and non-transitory computer-readable medium described herein, selecting the radio bearer mode may include operations, features, means, or instructions for identifying that the selected radio bearer mode may be a multicast/broadcast only mode.

In some examples of the method, apparatuses, and non-transitory computer-readable medium described herein, receiving the indication to serve the multicast/broadcast traffic to the one or more UEs may include operations, features, means, or instructions for establishing a multicast/broadcast N3 tunnel with a multicast/broadcast user plane function (UPF) in order to receive the multicast/broadcast traffic from the multicast/broadcast UPF, where the multicast/broadcast N3 tunnel may be one of multiple multicast/broadcast N3 tunnels for delivery of the multicast/broadcast traffic by the multicast/broadcast UPF within a broadcast service area.

Some examples of the method, apparatuses, and non-transitory computer-readable medium described herein may further include operations, features, means, or instructions for receiving an indication from the core network that the multicast/broadcast N3 tunnel may be for the multicast/broadcast only mode.

Some examples of the method, apparatuses, and non-transitory computer-readable medium described herein may further include operations, features, means, or instructions for transmitting the multicast/broadcast traffic to the at least one UE using a multicast/broadcast transmission based on the selected radio bearer mode being the multicast/broadcast only mode.

Some examples of the method, apparatuses, and non-transitory computer-readable medium described herein may further include operations, features, means, or instructions for determining, based on the selected radio bearer mode being the multicast/broadcast only mode, that the at least one UE may be to be in any of an IDLE, INACTIVE, or CONNECTED mode state in order to receive the multicast/broadcast traffic.

Some examples of the method, apparatuses, and non-transitory computer-readable medium described herein may further include operations, features, means, or instructions for receiving an indication from the core network that the one or more UEs may be to be in any of an IDLE, INACTIVE, or CONNECTED mode state in order to receive the multicast/broadcast traffic.

Some examples of the method, apparatuses, and non-transitory computer-readable medium described herein may further include operations, features, means, or instructions for configuring, via non-UE specific signaling on a multicast control channel message, a multicast radio bearer to carry the multicast/broadcast traffic to the at least one UE.

Some examples of the method, apparatuses, and non-transitory computer-readable medium described herein may further include operations, features, means, or instructions for indicating a change in a configuration of the multicast radio bearer to the at least one UE via a multicast control channel change notification, where the change may be indicated in a multicast radio bearer-specific field in the multicast control channel change notification.

In some examples of the method, apparatuses, and non-transitory computer-readable medium described herein, transmitting the multicast/broadcast traffic to the at least one UE may include operations, features, means, or instructions for improving a receive quality of the multicast/broadcast traffic when a UE of the at least one UE may be in an IDLE mode state, where the receive quality may be improved using at least one of a lower modulation and coding scheme or a higher redundancy level with respect to transmissions where the at least one UE may be in a CONNECTED mode state.

Some examples of the method, apparatuses, and non-transitory computer-readable medium described herein may further include operations, features, means, or instructions for receiving, from only UEs in a CONNECTED mode state of the at least one UE, at least one of a HARQ feedback associated with the multicast/broadcast traffic or a channel state information report.

Some examples of the method, apparatuses, and non-transitory computer-readable medium described herein may further include operations, features, means, or instructions for determining, based on the HARQ feedback, that the multicast/broadcast traffic may be to be retransmitted to a UE in the CONNECTED mode state, and retransmitting the multicast/broadcast traffic to the UE using a unicast transmission mode.

A method of wireless communication at a UE is described. The method may include receiving, from a base station, a traffic indication that multicast/broadcast traffic is available for the UE, receiving, from the base station, a state indication that identifies whether the UE is to be in a CONNECTED mode state in order to receive the multicast/broadcast traffic, and receiving the multicast/broadcast traffic while in one of an IDLE, INACTIVE, or CONNECTED mode state, consistent with the state indication.

An apparatus for wireless communication at a UE is described. The apparatus may include a processor, memory coupled with the processor, and instructions stored in the memory. The instructions may be executable by the processor to cause the apparatus to receive, from a base station, a traffic indication that multicast/broadcast traffic is available for the UE, receive, from the base station, a state indication that identifies whether the UE is to be in a CONNECTED mode state in order to receive the multicast/broadcast traffic, and receive the multicast/broadcast traffic while in one of an IDLE, INACTIVE, or CONNECTED mode state, consistent with the state indication.

Another apparatus for wireless communication at a UE is described. The apparatus may include means for receiving, from a base station, a traffic indication that multicast/broadcast traffic is available for the UE, receiving, from the base station, a state indication that identifies whether the UE is to be in a CONNECTED mode state in order to receive the multicast/broadcast traffic, and receiving the multicast/ broadcast traffic while in one of an IDLE, INACTIVE, or CONNECTED mode state, consistent with the state indication.

A non-transitory computer-readable medium storing code for wireless communication at a UE is described. The code may include instructions executable by a processor to receive, from a base station, a traffic indication that multicast/broadcast traffic is available for the UE, receive, from the base station, a state indication that identifies whether the UE is to be in a CONNECTED mode state in order to receive the multicast/broadcast traffic, and receive the multicast/broadcast traffic while in one of an IDLE, INACTIVE, or CONNECTED mode state, consistent with the state indication.

In some examples of the method, apparatuses, and non-transitory computer-readable medium described herein, receiving the state indication may include operations, features, means, or instructions for receiving a wake up message to trigger the UE to transition from an IDLE mode state to the CONNECTED mode state in order to receive the multicast/broadcast traffic, where the wake up message may be a per multicast/broadcast quality of service flow message.

In some examples of the method, apparatuses, and non-transitory computer-readable medium described herein, receiving the state indication may include operations, features, means, or instructions for receiving a broadcast page to trigger the UE to transition from an IDLE mode state to the CONNECTED mode state in order to receive the multicast/broadcast traffic.

In some examples of the method, apparatuses, and non-transitory computer-readable medium described herein, receiving the state indication may include operations, features, means, or instructions for monitoring a multicast control channel, and receiving a service announcement transmitted by the base station to UEs in a multicast/broadcast service area via the multicast control channel in order to trigger the UE to transition from an IDLE mode state to the CONNECTED mode state in order to receive the multicast/broadcast traffic.

In some examples of the method, apparatuses, and non-transitory computer-readable medium described herein, the multicast/broadcast service area encompasses a multicast/broadcast wake up area that may be based on an indication by a session management function (SMF).

Some examples of the method, apparatuses, and non-transitory computer-readable medium described herein may further include operations, features, means, or instructions for monitoring the multicast control channel may be periodic based on at least one of a broadcast discontinuous reception cycle configuration or a multicast control channel change period.

Some examples of the method, apparatuses, and non-transitory computer-readable medium described herein may further include operations, features, means, or instructions for receiving the multicast/broadcast traffic via a multicast radio bearer, transmitting, in response to reception of the multicast/broadcast traffic, a HARQ feedback, receiving a transmission mode indication that the multicast/broadcast traffic may be to be retransmitted using a dedicated radio bearer, and receiving a retransmission of the multicast/broadcast traffic via the dedicated radio bearer.

In some examples of the method, apparatuses, and non-transitory computer-readable medium described herein, the transmission mode indication may be received via either a RRC message or a MAC control element (CE).

Some examples of the method, apparatuses, and non-transitory computer-readable medium described herein may further include operations, features, means, or instructions for receiving the multicast/broadcast traffic via a multicast radio bearer, and transmitting a packet data convergence protocol (PDCP) or RLC status feedback message to the base station.

In some examples of the method, apparatuses, and non-transitory computer-readable medium described herein, the multicast/broadcast traffic may be received while the UE may be in an IDLE mode state.

Some examples of the method, apparatuses, and non-transitory computer-readable medium described herein may further include operations, features, means, or instructions for receiving a multicast radio bearer configuration via non-UE specific signaling on a multicast control channel message, where a multicast radio bearer may be to carry the multicast/broadcast traffic to the UE.

Some examples of the method, apparatuses, and non-transitory computer-readable medium described herein may further include operations, features, means, or instructions for receiving a multicast control channel change notification indicating a change in the multicast radio bearer configuration, where the change may be indicated in a multicast radio bearer-specific field in the multicast control channel change notification.

Some examples of the method, apparatuses, and non-transitory computer-readable medium described herein may further include operations, features, means, or instructions for identifying that the UE may be not in a CONNECTED mode state when the UE receives the multicast/broadcast traffic via a multicast radio bearer, identifying that a reception quality of the multicast/broadcast traffic may be below a threshold, and transitioning to a CONNECTED mode state for future reception of the multicast/broadcast traffic via the multicast radio bearer based on the reception quality being below the threshold.

In some examples of the method, apparatuses, and non-transitory computer-readable medium described herein, the threshold may be associated with at least one of a block error rate, a received signal received power or received signal received quality measurement, or a dedicated establishment cause.

DETAILED DESCRIPTION

Figure 1:
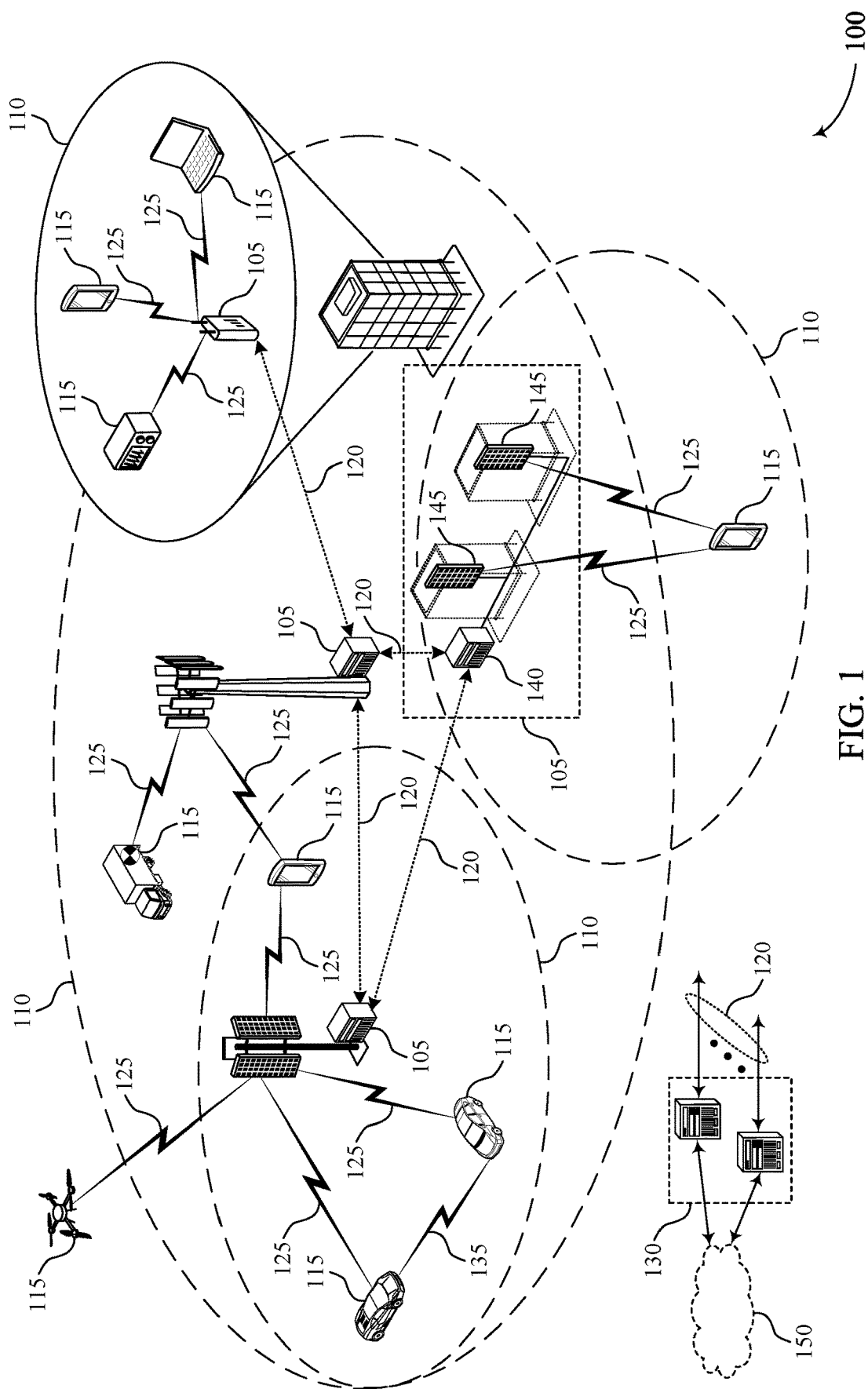
FIG. 1 illustrates an example of a system for wireless communication that supports delivery of broadcast services using different broadcast/multicast radio bearer modes in accordance with aspects of the present disclosure.

Some radio access technologies (RATs) may support unicast communications, in which data may be transmitted to a single user equipment (UE), and broadcast or multicast communications, in which data is transmitted to multiple UEs. These services may support different communication service verticals, such as vehicle to everything (V2X), industrial internet of things (I-IOT), extended reality (XR), etc. Each of the services may be associated with different quality of service (QoS) requirements, and the QoS may be associated with the receiving UEs being in a CONNECTED mode state or an IDLE or INACTIVE state.

Accordingly, techniques described herein support a new radio (NR) mixed mode, that may allow a base station to switch between multicast and unicast transmissions. For example, the base station may receive multicast/broadcast traffic from a core network component and communicate the multicast/broadcast to one or more UEs using multicast/broadcast techniques or using unicast techniques. The base station may determine whether to use multicast/broadcast techniques or unicast techniques based on a QoS associated with the multicast/broadcast traffic as well as connected states of UEs. Dependent on the selected mode (e.g., multicast/broadcast and/or unicast), the base station may utilize a data radio bearer (DRB) or multicast radio bearer (MRB) for communication of the traffic. Further, the services and bearer (MRB or DRB) configurations may be configured for various UEs using either RRC signaling or multicast control channel (MCCH) procedures.

Further techniques may provide for mode switching by a base station. For example, a base station may configure that a receiving UE be in a CONNECTED mode state rather than an INACTIVE or IDLE state dependent on the multicast/broadcast traffic received from the core network and the QoS requirements associated with such traffic. Accordingly, if the multicast/broadcast traffic is associated with a QoS that needs high reliability, then the base station may perform a transmission (e.g., a wake-up message, a broadcast, page, a multicast control channel message) to change the UE to a CONNECTED mode state such that the UE may receive the traffic in accordance with the QoS reliability requirements.

Particular aspects of the subject matter described herein may be implemented to realize one or more advantages. The described techniques may support improvements in the delivering traffic to satisfy QoS requirements, decreasing signaling overhead, and improving reliability, among other advantages. As such, supported techniques may include improved network operations and, in some examples, may promote network efficiencies, among other benefits. Aspects of the disclosure are initially described in the context of wireless communications systems. Aspects of the disclosure are further described with respect to wireless communications systems and a process flow diagram. Aspects of the disclosure are further illustrated by and described with reference to apparatus diagrams, system diagrams, and flowcharts that relate to delivery of broadcast services using different broadcast/multicast radio bearer modes.

FIG. 1 illustrates an example of a wireless communications system 100 that supports delivery of broadcast services using different broadcast/multicast radio bearer modes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Various UEs 115 and base stations 105 in the wireless communications system 100 may operate in one or more communication service verticals, such I-IOT, V2X, XR, enhanced multimedia broadcast multicast television (MBMS) (enTV), etc. For example, devices (e.g., UEs 115 and base stations 105) may operate in 5G/NR mixed mode (e.g., mixed multicast/broadcast and unicast mode) which may introduce multicast/broadcast transmissions to the wireless communications system 100 with minimal impact on a 5G unicast system. The mixed mode may be flexible to support multiple service layers, such as V2X, I-IOT, and XR and the QoS requirements associated with the verticals. The mixed mode may be utilized for multimedia, V2X, and/or file downloads. In some cases, the devices may implement a multicast/broadcast (MB) QoS flow model and use multiple modes for different requirements, such as high reliability (e.g., for V2X), best effort broadcast mode, etc.

The devices may also operate to implement 5G broadcast TV, which may be used to integrate enTV with the 5G core network 130. The 5G broadcast TV implementations may be used for broadcast TV, free-to-air models, and dedicated networks. The 5G broadcast network system may include characteristics such as reuse E-UTRA enTV air interface (supported by high power high tower (HPHT)) and clean slate service based 5G enTV CN with service-based architecture focused on broadcast TV service.

To support the verticals and the associated quality of services, the techniques described herein provide for base stations 105 (e.g., RANs) determining whether to deliver multicast/broadcast traffic (e.g., received from the core network 130) using a multicast/broadcast bearer mode (e.g., using a MRB or DRB) or using a unicast mode (e.g., using a DRB). That is, a base station 105 may receive an indication from the core network 130 to serve multicast/broadcast traffic to one or more UEs 115. The base station 105 may select a radio bearer mode for transmission of the multicast/broadcast traffic to the UEs 115. The selection may be based on a QoS associated with the traffic, a UE connection state mode associated with the traffic, a current connected state mode for the one or more UEs 115 in the service area of the base station 105, or a combination thereof. Further, the services and bearer (MRB or DRB) configurations may be configured for various UEs 115 using either RRC signaling or MCCH procedures by the base station 105.

To further support of the verticals and the associated QoS, the techniques provide for base station 105 configuring one or more UEs 115 for receipt of the multicast/broadcast traffic received from the core network 130. For example, if a UE 115 is in an INACTIVE or IDLE state and the core network 130 indicates that the QoS associated with the traffic requires the UE 115 to be in a CONNECTED state (e.g., such that the traffic may be acknowledged), then the base station 105 may configure the UE 115 to be in a CONNECTED state (e.g., RRC_CONNECTED and CM_CONNECTED). The base station 105 may then transmit the multicast/broadcast traffic to the UE 115 using a multicast/broadcast radio bearer mode or a unicast radio bearer mode.

Figure 2:
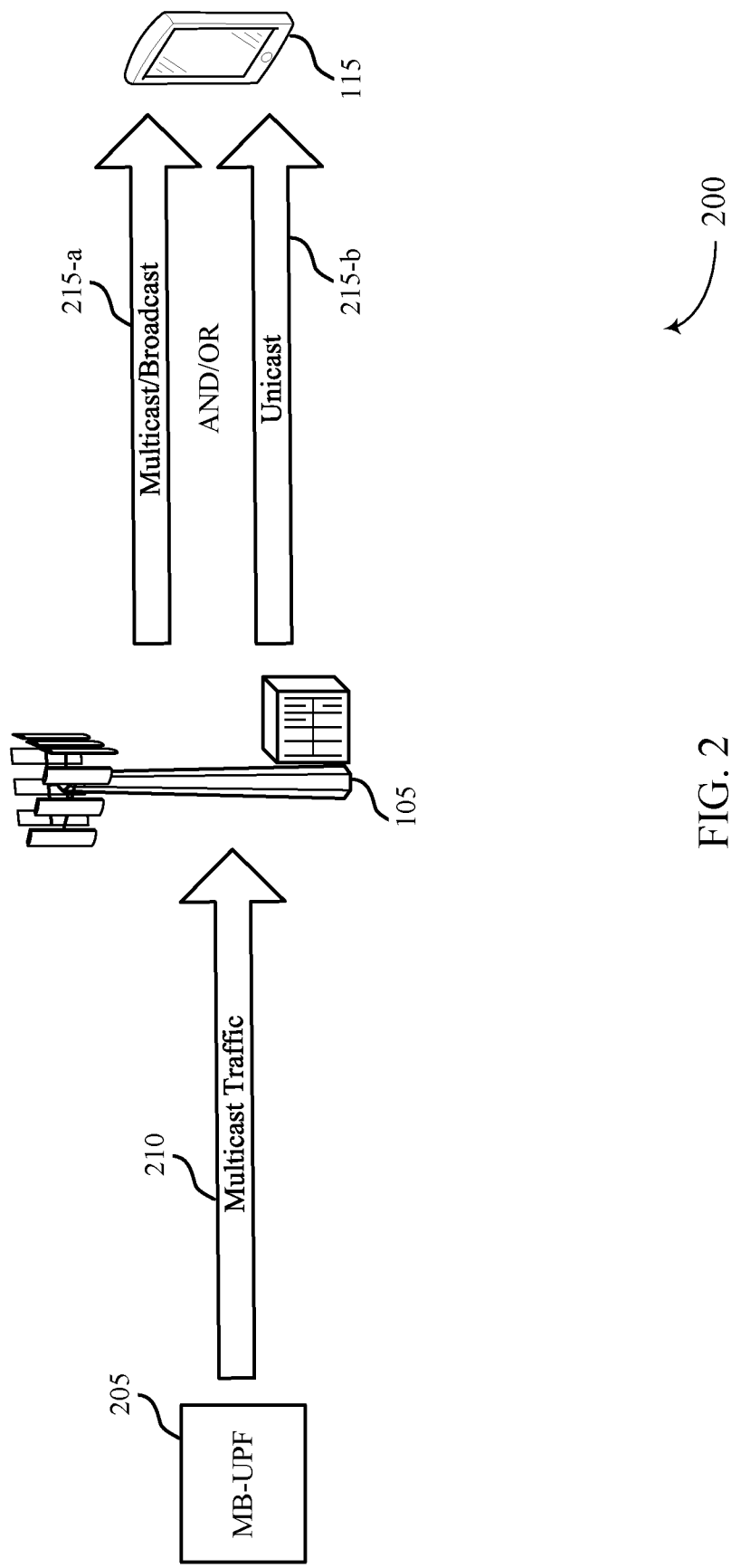
FIG. 2 illustrates an example of a wireless communications system that supports delivery of broadcast services using different broadcast/multicast radio bearer modes in accordance with aspects of the present disclosure.

FIG. 2 illustrates an example of a wireless communications system 200 that supports delivery of broadcast services using different broadcast/multicast radio bearer modes in accordance with aspects of the present disclosure. In some examples, wireless communications system 200 may implement aspects of wireless communications system 100. The wireless communications system 200 includes a base station 105 and a UE 115, which may be examples of the corresponding devices of FIG. 1. The wireless communications system 200 further includes a multicast/broadcast user plane function (MB-UPF) 205. The MB-UPF 205 may be a component of a core network (e.g., core network 130 of FIG. 1) that provides packet classification, aggregation, forwarding, routing, policy enforcement, and data buffering functionality as well as other functions.

The MB-UPF 205 may provide indications to the base station 105 to serve multicast/broadcast traffic 210 to one or more UEs 115. The base station may select a radio bearer mode for delivery of the traffic to at least one UE 115. The mode may be a multicast/broadcast mode, mixed multicast/broadcast and unicast mode, or a unicast only mode. The selection may be based on the indications received from the MB-UPF 205. For example, the indication may identify a MB-QoS flow, which may be associated with a QoS level. Further, the indications may identify whether the UEs 115 need to be in a connected state (e.g., a CM_CONNECTED state). In some cases, the connected state may be determined by a base station 105 in accordance with the QoS level associated with the indicated flow. That is, the base station 105 may determine whether the UE 115 is to be in a RRC-connected state based on a QoS level for the indicated MB-QoS flow.

In accordance with the QoS level associated with the multicast/broadcast traffic 210, the base station 105 (e.g., RAN) may select the mode and deliver the multicast/broadcast traffic 210 using a MRB or DRB. For example, the base station 105 may determine that the multicast/broadcast traffic 210 is associated with a relatively lower reliability QoS and select the MRB for transmission of the traffic 210 to the UE 115. The base station may configure the MRB by non-UE specific signaling over the MCCH. In some cases, a MCCH change notification may be used to announce of MRB configuration change. Using the MRB, the base station 105 delvers the multicast/broadcast traffic 210 to the UE 115 in accordance with a multicast/broadcast transmission 215-a. In another example, the base station 105 may determine that the multicast/broadcast traffic 210 is associated with a high reliability QoS and select the DRB for transmission of the traffic 210 to the UE 115. Using the DRB, the base station 105 delivers the multicast/broadcast traffic to the UE 115 in accordance with a unicast transmission 215-b.

For a mixed multicast/broadcast and a unicast delivery mode, the core network (e.g., the MB-UPF 205) may determine a bearer type (e.g., whether the UEs 115 need to be in RRC-CONNECTED state for receiving traffic) to be used based on MB-QoS characteristics of the traffic. From the core network perspective, the UE 115 is expected to be in 5G NAS CM-CONNECTED mode to receive downlink (DL) transmissions for the MB-QoS flow. From a radio perspective (e.g., from the perspective of the base station 105), the UEs 115 may need to be in RRC_CONNECTED state. This may be due to the reliability requirement of service, which may be determined using the MB-QoS flow. In the RRC_CONNECTED state, the UEs 115 may provide HARQ feedback, PDCP feedback, and/or RLC status feedback. The radio access network (RAN) node (e.g., the base station 105) may perform retransmissions. L1 HARQ/L2 ARQ retransmissions may be performed using unicast or broadcast techniques.

The RAN node may deliver service to UEs based on MRB or DRB with reliable retransmission based on feedback received from RRC_CONNECTED state UEs 115. For MRB to DRB and DRB to MRB switching, the UE 115 may be notified using RRC or MAC-CE messaging. Using a MRB bearer, transmissions and retransmissions may be either broadcast or unicast depending on a bearer type configuration.

Further for mixed broadcast/multicast and unicast mode, an MB-N3 tunnel may be established towards RAN nodes (e.g., base stations 105) with UEs 115 in CM_CONNECTED/RRC-CONNECTED state with established MB-QoS flows. When the MB-N3 tunnel is established, there may be an indication from the core network to RAN nodes that the MB-QoS flow must be received by UEs 115 in a connected mode. A UE 115 may stay in a CM_IDLE/RRC_IDLE state when the UE 115 is not actively receiving any service from network. However, for UEs 115 that are in an idle state to receive QoS traffic requiring a connected state, the RAN node may transmit a wake up message per MB-QoS flow, and the wake up area may be determined by a session management function (SMF). Further, a RAN may announce the beginning of multicast/broadcast service to UEs in RRC_IDLE state using a broadcast page (e.g., to alert UEs 115 about service availability) or a multi-broadcast control channel (MBCCH) service announcement in the MB service area. In some cases, RRC_INACTIVE/RRC_IDLE mode UEs 115 may be configured to monitor MCCH/MBCCH periodically based on a broadcast discontinuous reception (DRX) cycle configuration and/or a MCCH change period. Service and bearer configurations may be delivered to the UEs 115 using either RRC dedicated signaling or MBCCH procedures.

For multicast/broadcast only delivery modes, from the core network perspective, UEs 115 may receive service in both CM-IDLE and CM-CONNECTED mode. From a radio perspective, UEs 115 may receive service in a RRC_IDLE, RRC_INACTIVE or RRC_CONNECTED state. If a particular UE 115 into RRC_CONNECTED (for any other purpose), UE should be able to receive broadcast service. When a particular UE 115 transitions between RRC_CONNECTED and RRC_IDLE/RRC_INACTIVE states, UE shall be able to receive same broadcast service. Multicast/broadcast only delivery modes may support unicast assistance for UEs 115 in a connected state such that UEs may provide feedback (e.g., CSI, ACK/NACK) and the base stations 105 may provide retransmissions (e.g., ARQ, HARQ).

In some cases, when in multicast/broadcast only delivery modes, UEs 115 that are in a RRC_IDLE mode (e.g., for power saving) may receive traffic when the channel condition is of a relatively high quality. In some cases, the base station 105 may determine to increase the RRC_IDLE receiving quality using low MCS, high redundancy, or a combination thereof. The MRB may be configured by non-UE specific signaling over MBCCH. A MBCCH/MCCH change notification may be used to announce a MRB configuration change. The notification message may use a different bit to indicate a different MRB. The UE 115 may receive the MBCCH when the configuration of its interested (e.g., monitored) MRBs are changed.

In the multicast/broadcast only delivery mode, the traffic may be delivered over a defined broadcast service area. For example, the MB-N3 tunnels may be set up for RAN nodes in a particular area. When the MB-N3 tunnel is established, the core network may indicate that the tunnel is for multicast/broadcast delivery mode. Additionally, the UE 115 may transition into connected mode if the reception quality for the service is below a given threshold (either by e.g., implementation, observed BLER, signaled RSRP/RSRQ threshold, etc.). A dedicated RRC establishment cause can be used for this purpose (e.g., establishmentCause="broadcastEnh").

Various modes of operation are described herein. For a multicast mode, a UE 115 may be in a connected state, and the network may use the DRB or the MRB to communicate with the UE in the multicast mode. In one example of a multicast mode, a number of UEs 115 may request access to a same service (e.g., a content stream). The network may group the requesting UEs 115 and may use the MRB and/or DRB for service delivery as described herein. In such cases, if a relatively low number of UEs 115 are requesting access to the service, then the network may deliver the content using DRB (e.g., UE specific radio bearer). If there are a relatively high number of UEs 115 requesting access to the service, then the network may use the MRB. For a unicast mode, the UE 115 may be in a connected state, and the network may use the DRB. For a broadcast mode, the UE 115 may be idle or connected, and the network may use the MRB. In one example, a broadcast service may be an example of a network stream over wireless communication, and the network may not account for the number of UEs 115 or the identity/configuration of the UEs 115 requesting access to the service. Thus, the MRB may be used. As referred to herein, a "mixed broadcast/multicast and unicast mode" refers to the multicast mode that may use a DRB (unicast) or MRB (multicast). A "multicast/broadcast only delivery mode" refers to the broadcast mode in which the MRB is used.

Figure 3:
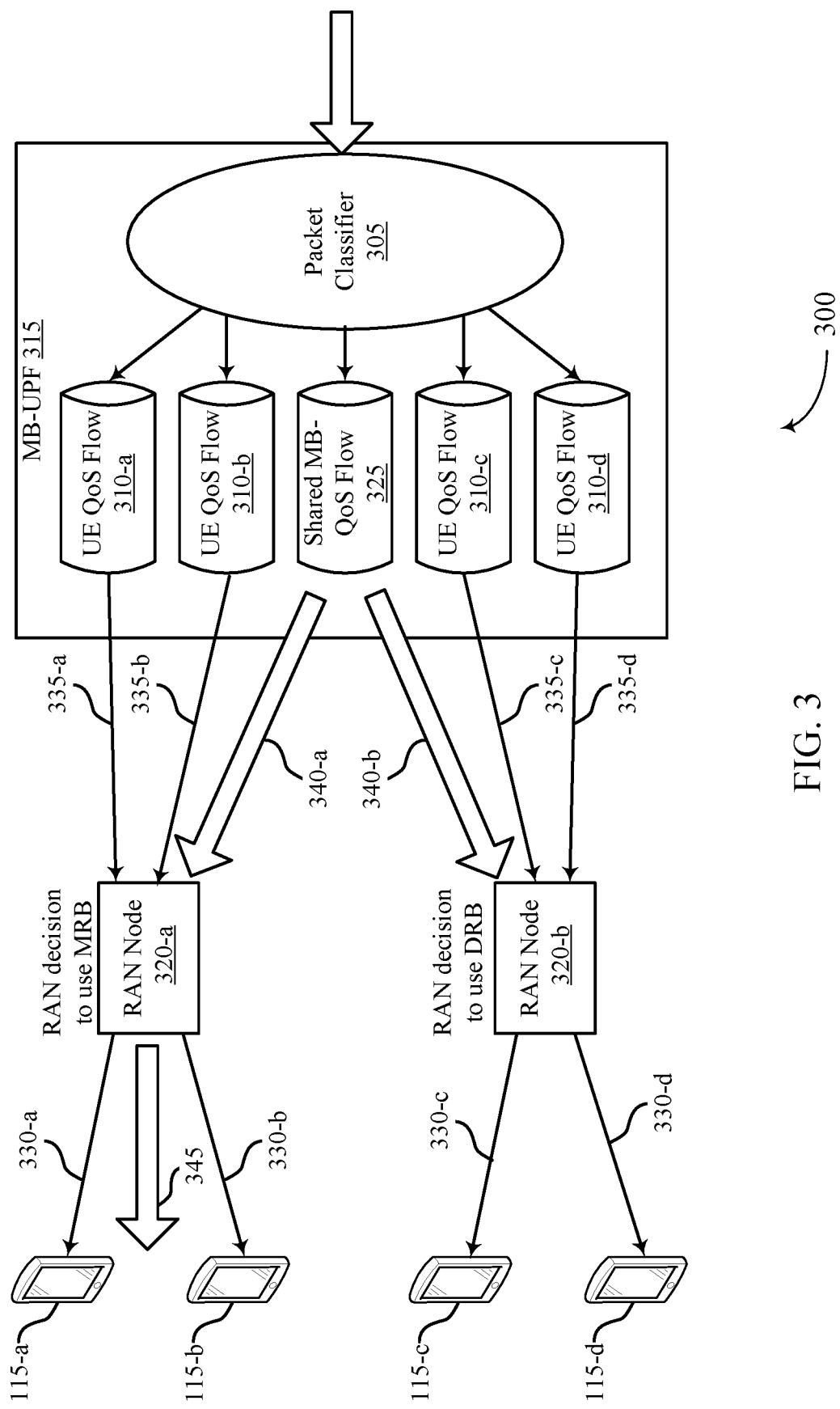
FIG. 3 illustrates an example of a wireless communications system that supports delivery of broadcast services using different broadcast/multicast radio bearer modes in accordance with aspects of the present disclosure.

FIG. 3 illustrates an example of a wireless communications system 300 that supports delivery of broadcast services using different broadcast/multicast radio bearer modes in accordance with aspects of the present disclosure. In some examples, wireless communications system 300 may implement aspects of wireless communications system 100. The wireless communications system 300 includes RAN nodes 320 and UEs 115. The RAN nodes 320 may be examples of base stations 105 as described with respect to FIGS. 1 and 2. The wireless communications system 300 further includes a MB-UPF 315, which may be an example of the MB-UPF 205 as described with respect to FIG. 2.

In some cases, the 5G/NR QoS model is extended to support MB-QoS flow. A protocol data unit (PDU) session may be established between each UE 115 and a respective RAN node 320. Each PDU session may be UE specific (e.g., each UE 115 receives a unique PDU session ID). A PDU session may contain a unicast flow 310, which may not be shared with other UEs 115, and a MB-QoS flow 325, which may be shared with other UEs 115.

The MB-UPF 315 includes a packet classifier 305 and receives traffic from upstream network components. The packet classifier 305 may analyze received traffic and determine which flow (e.g., UE flows 310 and/or Shared MB flow 325) to utilize to deliver the traffic. The flow may be determined based on the QoS associated with the traffic, the intended recipient (e.g., which UEs 115 are to receive the traffic), etc. In some cases, the MB-UPF 315 (e.g., core network) may determine whether the UEs 115 are to be in a CM_CONNECTED state or a CM_IDLE state to receive the traffic. This determination may be based on the determined MB-QoS flow type. The RAN nodes 320 may determine whether the UEs 115 are to be in a RRC_CONNECTED state (or not) for receiving the traffic. This may be determined according to the QoS flow type (e.g., unicast or multicast/broadcast).

Each UE specific flow 310 and multicast/broadcast shared flow 325 may include communication tunnels (e.g., each unicast tunnels 335 and multicast/broadcast tunnels 340), and each tunnel may be associated with unique tunnel endpoint identifiers (TEIDs). The multicast/broadcast tunnels 340 may be examples of multicast/broadcast N3 (MB-N3) shared tunnels with shared TEIDs. In some cases, receipt of an indication to serve multicast/broadcast traffic to one or more UEs 115 may include establishing a MB-N3 shared tunnel 340 with the MB-UPF 315.

In an example traffic pattern for the wireless communications system 300, the MB-UPF 315 may receive traffic intended for UE 115-a. The MB-UPF may select UE QoS flow 310-a, which routes the traffic to RAN node 320-a using UE specific tunnel 335. The RAN node 320-a may then deliver the traffic to the UE 115-a in accordance with a DRB 330-a for the UE 115-a In another example, traffic pattern, the MB-UPF 315 receives multicast/broadcast traffic and selects the shared MB-QoS flow 325-a for communication of the multicast/broadcast traffic. The MB-UPF 315 may establish the MB-N3 shared tunnel 340-a with the RAN node 320-a for delivery of the multicast/broadcast traffic to UE 115-a and UE 115-b. The MB-UPF 315 may further determine whether the UEs 115 are to receive the traffic in a CM_CONNECTED state or a CM_IDLE state, and the MB-UPF may indicate as such to the RAN node 320. The RAN node 320-a may receive an indication from the MB-UPF 315 to serve the multicast/broadcast traffic to the UE 115-a and UE 115-b. The RAN Node 320-a may then select a radio bearer mode for delivery of the multicast traffic to the UE 115-a and 115-b. The selected mode may be a multicast/broadcast only mode, a mixed multicast/broadcast and unicast mode, or a unicast mode and may be dependent on the QoS associated with the multicast/broadcast traffic and whether the UEs are to be in a CONNECTED state or not. In the case of FIG. 3, the RAN node 320-a determines to use multicast/broadcast only mode or a mixed multicast/broadcast and unicast mode and delivers the traffic to the UE 115-a and UE 115-b using MRB 345 and according to multicast/broadcast techniques. The RAN Node 320-a may use the MRB based on the QoS level associated with the traffic being relatively low. For example, the traffic may be enTV traffic, in which the network may not need acknowledgement that the UEs 115 receive the traffic. That is, the traffic may be broadcast to UEs 115 in varying states (e.g., CONNECTED, INACTIVE, or IDLE).

In another example, traffic pattern, the MB-UPF 315 receives multicast/broadcast traffic and selects the shared MB-QoS flow 325-a for communication of the multicast/broadcast traffic. The MB-UPF 315 may establish the MB-N3 shared tunnel 340-b with the RAN node 320-b for delivery of the multicast/broadcast traffic to UE 115-c and UE 115-d. The MB-UPF 315 may further determine whether the UEs 115 are to receive the traffic in a CM_CONNECTED state or a CM_IDLE state, and the MB-UPF 315 may indicate as such to the RAN node 320-b. The RAN node 320-b may receive an indication from the MB-UPF 315 to serve the multicast/broadcast traffic to the UE 115-c and UE 115-d. The RAN Node 320-a may then select a radio bearer mode for delivery of the multicast traffic to the UE 115-c and 115-d. The selected mode may be a multicast/broadcast only mode, a mixed multicast/broadcast and unicast mode, or a unicast mode and may be dependent on the QoS associated with the multicast/broadcast traffic and whether the UEs are to be in a CONNECTED state or not. In the case of FIG. 3, the RAN node 320-b determines to use a mixed multicast/broadcast and unicast mode or a unicast only mode and delivers the traffic to the UE 115-c and UE 115-d using respective DRBs 330-c and 33-d and according to unicast techniques. The RAN Node 320-a may use the DRB based on the QoS level associated with the traffic being relatively high. For example, the traffic may be V2X traffic, which may require acknowledgement that the UEs 115 receive the traffic. That is, the UEs 115-c and 115-d may need to be in a connected state to receive the traffic and perform one or more feedback operations associated with the traffic.

Figure 4:
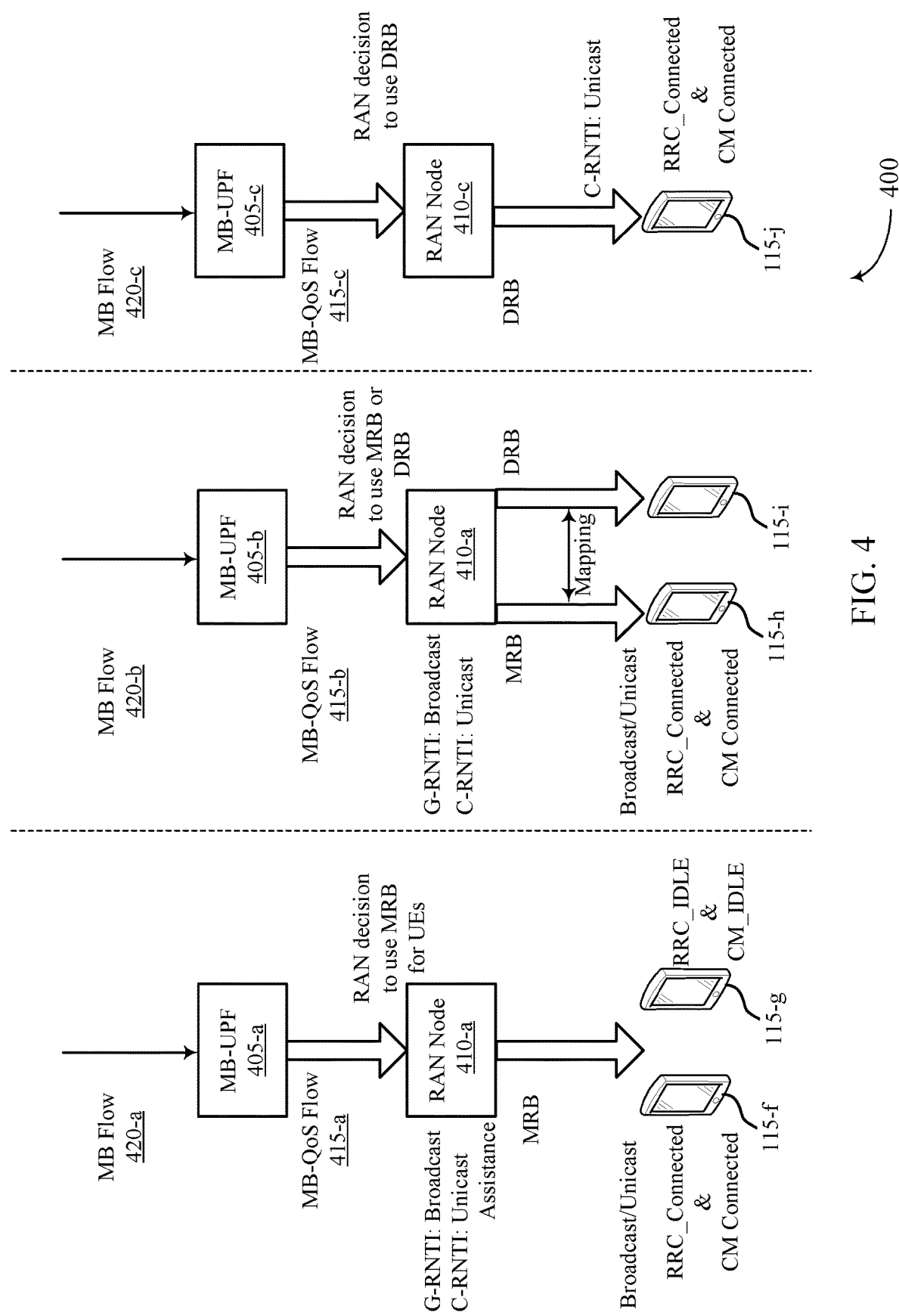
FIG. 4 illustrates examples of a quality of service (QoS) flow types that support delivery of broadcast services using different broadcast/multicast radio bearer modes in accordance with aspects of the present disclosure.

FIG. 4 illustrates examples of QoS flow types 400 that support delivery of broadcast services using different broadcast/multicast radio bearer modes in accordance with aspects of the present disclosure. In some examples, QoS flow types 400 may implement aspects of wireless communications system 100. The QoS flow types 400 include MB-UPFs 405, RAN nodes 410 and UEs 115. The RAN nodes 410 may be examples of base stations 105 as described with respect to FIGS. 1 and 2 and RAN nodes 320 as described with respect to FIG. 3. Each MB-QoS flow may receive traffic from a respective UPF 405, which may be an example of MB-UPFs 205 and 315 as described with respect to FIGS. 2 and 3.

At MB flow 420-*a*, MB-UPF 405-*a* receives data and communicates the data to edge network devices according to MB-QoS flow 415-*a*. MB-QoS flow 415-*a* illustrates the RAN node 410-*a* operating in a multicast/broadcast only bearer mode. The RAN node 410-*a* may receive an indication to serve multicast/broadcast traffic to one or more UEs 115 from the MB-UPF 405-*a*. In accordance with the received indication, the RAN node 410-*a* may establish a multicast/broadcast N3 tunnel with the MB-UPF 405-*a*. In some cases, the MB-UPF 405-*a* may indicate that the multicast/broadcast tunnel is to be used for multicast/broadcast only mode. The RAN node 410-*a* may receive the traffic via the multicast/broadcast N3 tunnel and transmit the multicast/broadcast traffic using a multicast/broadcast transmission (e.g., using a MRB) in accordance with the mode. Further, the RAN node 410-*a* may determine, based on the multicast/broadcast only mode, that the UE 115-*f* and 115-*g* may be in of an IDLE, INACTIVE, or CONNECTED state to receive the traffic. The RAN node 410-*a* may make such a determination based on an indication received from the core network. The RAN node 410-*a* may utilize a group radio network temporary identifier (G-RNTI) to perform the multicast/broadcast transmission.

In some cases, when the UE 115-*f* and/or UE 115-*g* is in an IDLE mode state, the RAN node 410-*a* may improve a receive quality of the multicast/broadcast traffic such that the UE 115-*a* has an improved chance of receiving the traffic. In one example, the RAN node improves the quality using a lower modulation and coding scheme with respect to transmissions where one of the UEs 115 is in a CONNECTED mode state. In another example, the RAN node 410-*a* improves the signal quality using a higher redundancy level with respect to transmissions where one of the UEs 115 is in a CONNECTED mode state. In some cases, the RAN node 410-*a* may utilize a lower modulation and coding scheme and a higher redundancy level to improve the receive quality.

In some cases when the RAN node 410-*a* is communicating with the UEs 115-*f* and 115-*g* using a broadcast/unicast only mode, the RAN node 410-*a* may receive feedback from one or more of the UEs that are in a CONNECTED state. The feedback may be in the form of a HARQ feedback or a channel state information report. The RAN node 410-*a* may retransmit the broadcast/multicast traffic to the UE using a unicast transmission mode (e.g., unicast assistance). In such cases, the RAN node 410-*a* may utilize a C-RNTI for the receiving UE. In other cases, the RAN node 410-*a* may retransmit the traffic using the multicast/broadcast mode and using a G-RNTI.

At MB flow 420-*b*, MB-UPF 405-*b* receives data and communicates the data to edge network devices according to MB-QoS flow 415-*b*. MB-QoS flow 415-*b* illustrates the RAN node 410-*b* operating in a mixed multicast/broadcast bearer mode and unicast mode. The RAN node 410-*b* may receive an indication to serve multicast/broadcast traffic to one or more UEs 115 from the MB-UPF 405-*b*. In accordance with the received indication, the RAN node 410-*b* may establish a multicast/broadcast N3 tunnel with the MB-UPF 405-*b*. In some cases, the MB-UPF 405-*b* may indicate that the multicast/broadcast tunnel is to be used for mixed multicast/broadcast and unicast mode based at least in part on a QoS associated with the traffic. The RAN node 410-*b* may receive the traffic via the multicast/broadcast N3 tunnel and transmit the multicast/broadcast traffic using a multicast/broadcast transmission (e.g., using a MRB) or a unicast transmission (e.g., using a DRB). In some cases, the RAN node 410-*b* may determine that the UEs 115-*h* and 115-*i* are to be in a CONNECTED mode only state in order to receive the multicast/broadcast traffic. In some cases, the RAN node 410-*b* may receive an indication from the core network that the UE 115-*h* and/or the 115-*i* are to be in a CONNECTED mode only state in order to receive the multicast/broadcast traffic. The RAN node 410-*b* may utilize a group radio network temporary identifier (G-RNTI) to perform the multicast/broadcast transmission.

In cases where the receiving UE 115—are to be in a connected mode state, the RAN node 410-*b* may transmit a communication to UEs 115 to trigger the UE 115 to be in a CONNECTED mode states. For example, the RAN node 410-*b* may transmit a wake up message to trigger a UE 115 to transition to a CONNECTED mode only state to receive the multicast/broadcast traffic. In other cases, the RAN node 410-*b* may transmit a broadcast page to trigger a UE 115 to transition to the CONNECTED mode state in order to receive the multicast/broadcast traffic. In yet other cases, the RAN node 410-*b* may transmit a service announcement to one or more UEs 115 in a multicast/broadcast service area via a multicast broadcast control channel (MCCH/MBCCH) to trigger the UE 115 to transition to the CONNECTED mode state. The multicast/broadcast service area may encompass a multicast/broadcast wake up area that is based at least in part on a session management function (SMF).

In response to receiving the multicast/broadcast traffic from the RAN node 410-*a*, one or more of the UEs 115-*h* and 115-*i* (e.g., in a CONNECTED mode state) may transmit HARQ feedback associated with the multicast/broadcast traffic or a packet data convergence protocol (PDCP) or radio link control (RLC) status feedback. In response to receiving the feedback, the RAN node 410-*a* may determine to retransmit the multicast/broadcast traffic to the UE using either a unicast mode or multicast/broadcast mode. Accordingly, if the RAN node 410-*a* transmits the traffic using a multicast/broadcast mode and retransmits the traffic to the UE 115 using a unicast mode, then the RAN node 410-*a* may switch from use of a MRB to a DRB for retransmission of the multicast/broadcast traffic. Alternatively, if the RAN node 410-*a* transmits the traffic using a unicast mode and retransmits the traffic using a multicast/broadcast mode, then the RAN node 410-*a* may switch from use of a DRB to a MRB. In either case, the RAN node 410-*a* may indicate the radio bearer switch via a RRC message or a media access control (MAC) control element (CE) (MAC-CE) message. Accordingly, the RRC message or MAC-CE message may include a field for indicating a mode switch. In some cases, a MRB and a DRB may be mapped such that the UE 115 may be able to efficiently switch to receive the traffic according to the mode determined by the RAN node 410-*b*.

At MB flow 420-*c*, MB-UPF 405-*c* receives data and communicates the data to edge network devices according to MB-QoS flow 415-*c*. MB-QoS flow 415-*c* illustrates the RAN node 410-*c* operating in a unicast mode. The RAN node 410-*c* may receive an indication to serve multicast/broadcast traffic to one or more UEs 115 from the MB-UPF 405-*c*. In accordance with the received indication, the RAN node 410-*c* may establish a multicast/broadcast N3 tunnel with the MB-UPF 405-*c*. In some cases, the MB-UPF 405-*c* may indicate that the multicast/broadcast tunnel is to be used for unicast mode only based at least in part on a QoS associated with the traffic. In other cases, the RAN node 410-*c* may determine to use unicast based on a QoS associated with the traffic and/or based on the number of UEs 115 connected to the RAN node 410-*c*. For example, if the RAN node 410-*c* determines that one UE 115 (e.g., UE 115-*j*) is connected to the RAN node 410-*c*, then the RAN node 410-*c* may determine to use unicast only mode. The RAN node 410-*c* may receive the traffic via the multicast/broadcast N3 tunnel and transmit the multicast/broadcast traffic using a unicast transmission (e.g., using a DRB). In some cases, the RAN node 410-*c* may determine that the UE 115-*j* is to be in a CONNECTED mode only state in order to receive the multicast/broadcast traffic. In some cases, the RAN node 410-*b* may receive an indication from the core network that the UE 115-*j* is to be in a CONNECTED mode only state in order to receive the unicast traffic. The RAN node 410-*c* may utilize a C-RNTI to perform the unicast transmission. In cases where the UE 115-*j* is not in a CONNECTED mode state, then the RAN node 410-*c* may indicate to the UE 115-*j* to transmission to the CONNECTED mode state in accordance with techniques described above (e.g., wake up message, broadcast page, MBCCH service announcement).

Figure 5:
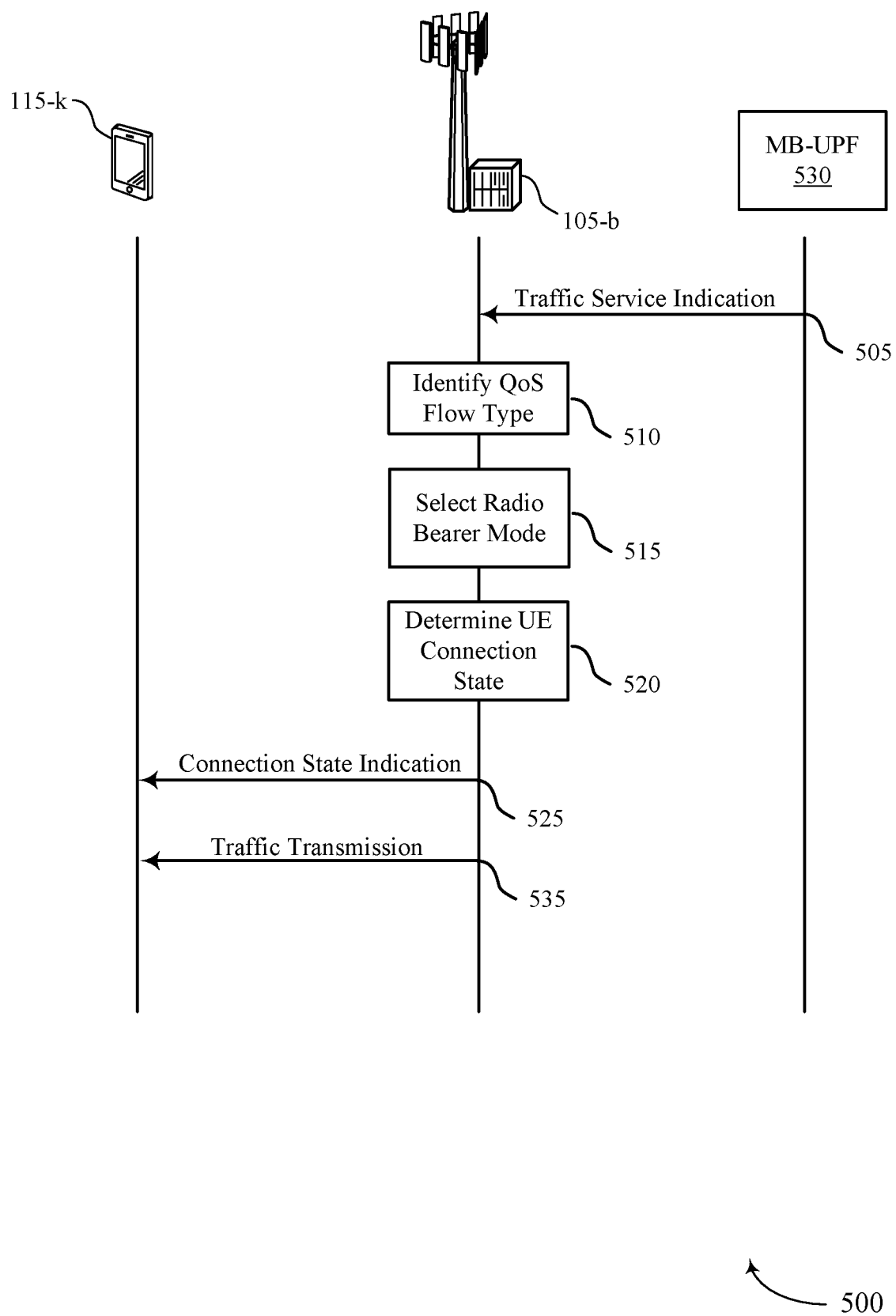
FIG. 5 illustrates an example of a process flow diagram that supports delivery of broadcast services using different broadcast/multicast radio bearer modes in accordance with aspects of the present disclosure.

FIG. 5 illustrates an example of a process flow diagram 500 that supports delivery of broadcast services using different broadcast/multicast radio bearer modes in accordance with aspects of the present disclosure. In some examples, process flow diagram 500 may implement aspects of wireless communications system 100. The process flow diagram 500 includes UE 115-*j*, base station 105-*b*, and MB-UPF 530, which may be examples of the corresponding devices as described with respect to FIGS. 1 through 4. For example, the base station 105-*b* may be an example of the RAN nodes 320 of FIG. 3 and RAN nodes 410 of FIG. 4.

At 505, the base station 105-*b* receives an indication from a core network (e.g., MB-UPF 530) to serve multicast/broadcast traffic to one or more UEs 115. In some cases, according to the indication, the MB-UPF 530 and the base station 105-*b* may establish a MB N3 tunnel. In some cases, the indication may include an indication of a QoS flow type, a UE connection state, or a combination thereof.

At 510, the base station 510 identifies that the multicast/broadcast traffic is associated with a QoS flow type. At 514, the base station 105-*b* selects a radio bearer mode from a plurality of radio bearer modes for delivery of the multicast/broadcast traffic to at least one UE. The selecting may be based at least in part on the indication. For example, the indication may specify a radio bearer mode for the multicast/broadcast traffic. At 520, the base station 105-*b* determines a UE connection state for receiving the multicast/broadcast traffic. In some cases, the UE connection state is determined based at least in part on the quality of service flow type associated with the multicast/broadcast traffic. For example, for relatively high QoS traffic, the connection state may be a CONNECTED mode state (e.g., RRC_CONNECTED). In another example, for relatively low QoS traffic, the connection state may be any of IDLE, INACTIVE, or CONNECTED mode states.

At 525, the UE 115-*k* receives, from the base station 105-*b*, a connection state information that identifies whether the UE is to be in a CONNECTED mode state in order to receive the multicast/broadcast traffic. The connected state indication also serves to identify as a traffic indication that multicast/broadcast traffic is available for the UE 115-*k*. In some cases, the state indication is transmitted using a wake up message, a broadcast page, a service announcement via MBCCH, etc.

At 535, the base station 105-*b* transmits the multicast/broadcast traffic to the UE 115-*k* using the selected radio bearer mode. The multicast/broadcast traffic may be delivered using a unicast mode or a multicast/broadcast mode.

For a unicast transmission, the base station 105-*b* may utilize a DRB, and for a multicast/broadcast transmission, the base station 105 may utilize a MRB. In some cases, the base station 105-*b* may switch modes for retransmission of the traffic responsive to received feedback.

Figure 6:
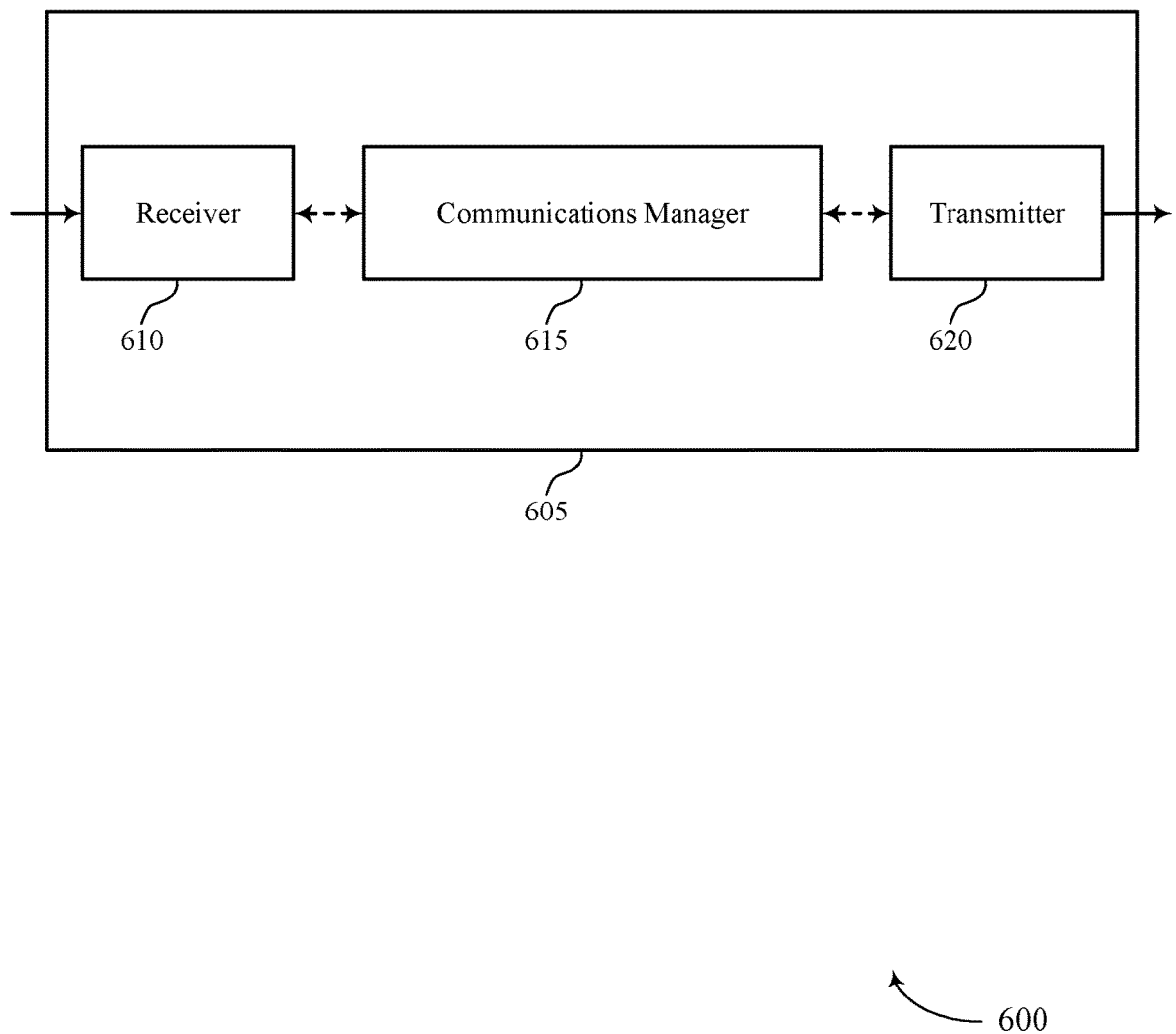
FIGS. 6 and 7 show block diagrams of devices that support delivery of broadcast services using different broadcast/multicast radio bearer modes in accordance with aspects of the present disclosure.

FIG. 6 shows a block diagram 600 of a device 605 that supports delivery of broadcast services using different broadcast/multicast radio bearer modes in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to delivery of broadcast services using different broadcast/multicast radio bearer modes, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a traffic indication that multicast/broadcast traffic is available for the UE, receive, from the base station, a state indication that identifies whether the UE is to be in a CONNECTED mode state in order to receive the multicast/broadcast traffic, and receive the multicast/broadcast traffic while in one of an IDLE, INACTIVE, or CONNECTED mode state, consistent with the state indication. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a modem, and the receiver 610 and transmitter 620 may be implemented as analog components (e.g., amplifiers, filters, antennas) coupled with the modem to enable wireless transmission and reception over one or more bands.

The communications manager 615 as described herein may be implemented to realize one or more potential advantages. One implementation may allow the device 605 to more efficiently coordinate communication between a set of UEs and the device 605, and more specifically to coordinate multicast/broadcast traffic communication from the device 605 to one or more UEs 115. For example, the device 605 may identify a mode to use for transmitting traffic to a UE, based on QoS levels indicated by a core network.

Figure 7:
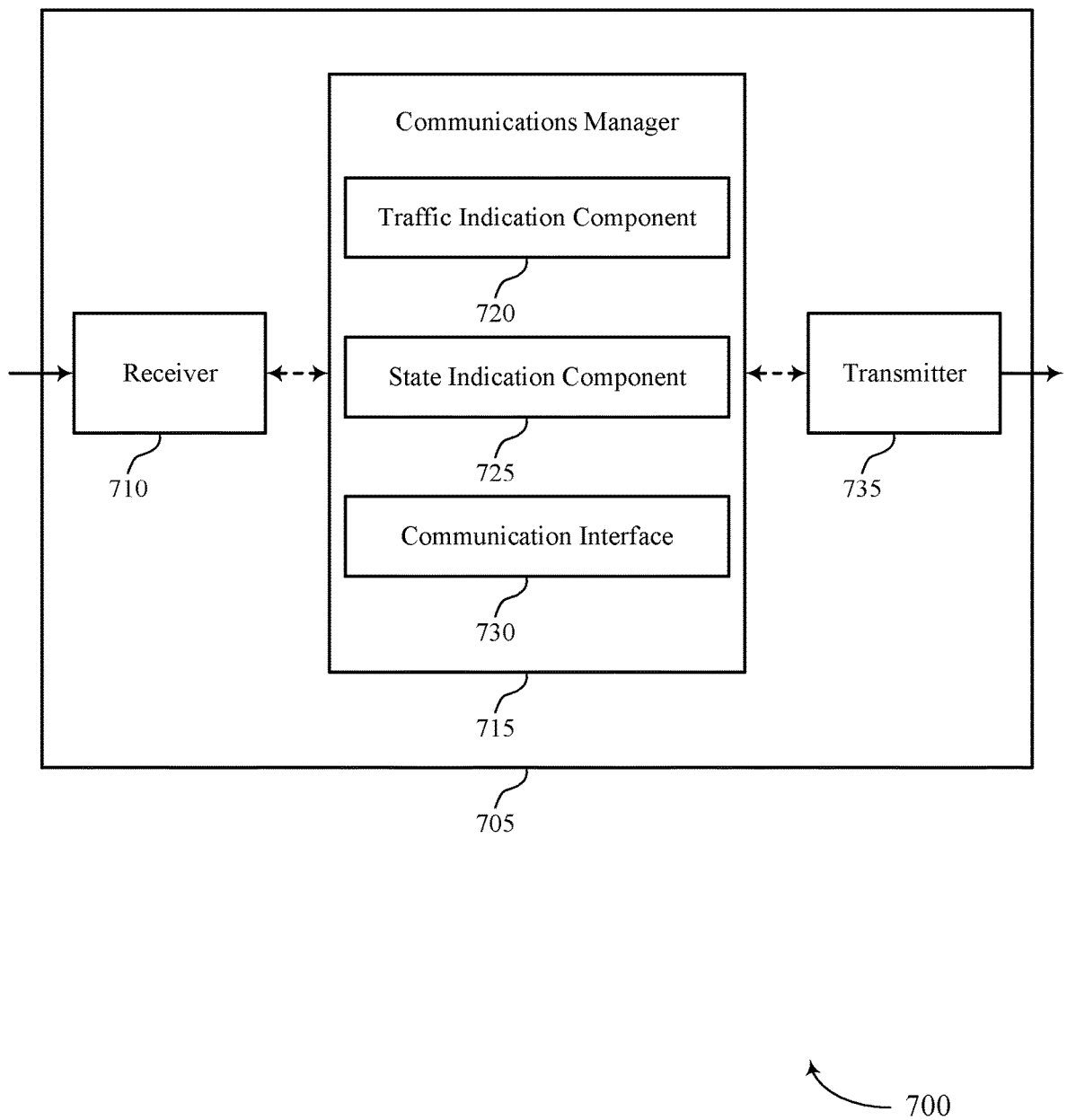

FIG. 7 shows a block diagram 700 of a device 705 that supports delivery of broadcast services using different broadcast/multicast radio bearer modes in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to delivery of broadcast services using different broadcast/multicast radio bearer modes, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a traffic indication component 720, a state indication component 725, and a communication interface 730. The communications manager 715 may be an example of aspects of the communications manager 910 described herein. The traffic indication component 720 may receive, from a base station, a traffic indication that multicast/broadcast traffic is available for the UE.

The state indication component 725 may receive, from the base station, a state indication that identifies whether the UE is to be in a CONNECTED mode state in order to receive the multicast/broadcast traffic. The communication interface 730 may receive the multicast/broadcast traffic while in one of an IDLE, INACTIVE, or CONNECTED mode state, consistent with the state indication.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
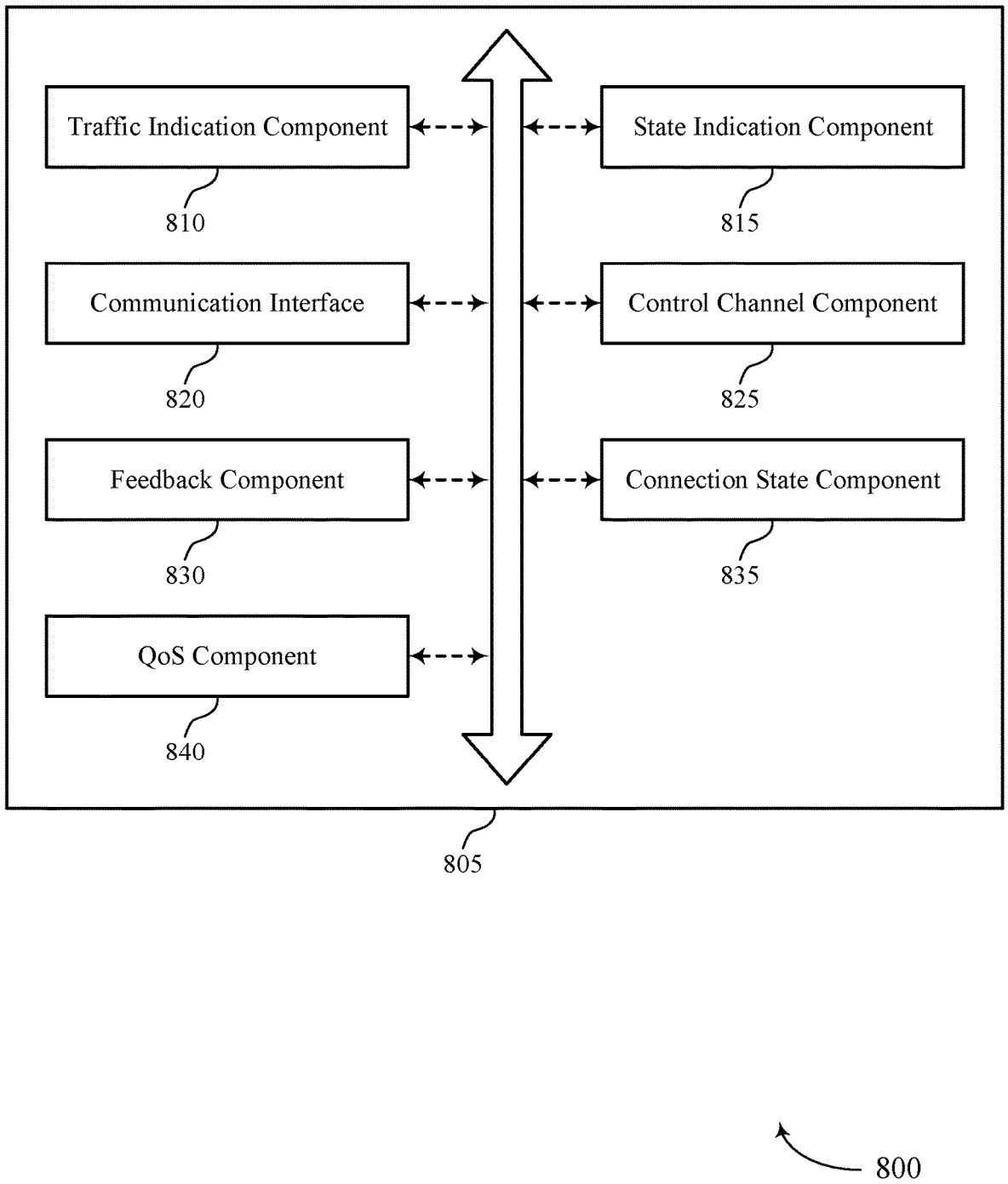
FIG. 8 shows a block diagram of a communications manager that supports delivery of broadcast services using different broadcast/multicast radio bearer modes in accordance with aspects of the present disclosure.

FIG. 8 shows a block diagram 800 of a communications manager 805 that supports delivery of broadcast services using different broadcast/multicast radio bearer modes in accordance with aspects of the present disclosure. The communications manager 805 may be an example of aspects of a communications manager 615, a communications manager 715, or a communications manager 910 described herein. The communications manager 805 may include a traffic indication component 810, a state indication component 815, a communication interface 820, a control channel component 825, a feedback component 830, a connection state component 835, and a QoS component 840. Each of these modules may communicate, directly or indirectly, with one another (e.g., via one or more buses). The traffic indication component 810 may receive, from a base station, a traffic indication that multicast/broadcast traffic is available for the UE.

In some examples, the traffic indication component 810 may receive a transmission mode indication that the multicast/broadcast traffic is to be retransmitted using a dedicated radio bearer. The state indication component 815 may receive, from the base station, a state indication that identifies whether the UE is to be in a CONNECTED mode state in order to receive the multicast/broadcast traffic.

In some examples, the state indication component 815 may receive a wake up message to trigger the UE to transition from an IDLE mode state to the CONNECTED mode state in order to receive the multicast/broadcast traffic, where the wake up message is a per multicast/broadcast quality of service flow message.

In some examples, the state indication component 815 may receive a broadcast page to trigger the UE to transition from an IDLE mode state to the CONNECTED mode state in order to receive the multicast/broadcast traffic. The communication interface 820 may receive the multicast/broadcast traffic while in one of an IDLE, INACTIVE, or CONNECTED mode state, consistent with the state indication.

In some examples, the communication interface 820 may receive the multicast/broadcast traffic via a multicast radio bearer. In some examples, the communication interface 820 may receive a retransmission of the multicast/broadcast traffic via the dedicated radio bearer.

In some examples, the communication interface 820 may receive the multicast/broadcast traffic via a multicast radio bearer. In some cases, the multicast/broadcast traffic is received while the UE is in an IDLE mode state. The control channel component 825 may monitor a multicast control channel.

In some examples, the control channel component 825 may receive a service announcement transmitted by the base station to UEs in a multicast/broadcast service area via the multicast control channel in order to trigger the UE to transition from an IDLE mode state to the CONNECTED mode state in order to receive the multicast/broadcast traffic.

In some examples, the control channel component 825 may monitor the multicast control channel is periodic based on at least one of a broadcast discontinuous reception cycle configuration or a multicast control channel change period.

In some examples, the control channel component 825 may receive a multicast radio bearer configuration via non-UE specific signaling on a multicast control channel message, where a multicast radio bearer is to carry the multicast/broadcast traffic to the UE.

In some examples, the control channel component 825 may receive a multicast control channel change notification indicating a change in the multicast radio bearer configuration, where the change is indicated in a multicast radio bearer-specific field in the multicast control channel change notification.

In some cases, the multicast/broadcast service area encompasses a multicast/broadcast wake up area that is based on an indication by a session management function (SMF). In some cases, the transmission mode indication is received via either a RRC message or a MAC control element (CE).

The feedback component 830 may transmit, in response to reception of the multicast/broadcast traffic, a HARQ feedback. In some examples, the feedback component 830 may transmit a packet data convergence protocol (PDCP) or RLC status feedback message to the base station. The connection state component 835 may identify that the UE is not in a CONNECTED mode state when the UE receives the multicast/broadcast traffic via a multicast radio bearer.

In some examples, the connection state component 835 may transition to a CONNECTED mode state for future reception of the multicast/broadcast traffic via the multicast radio bearer based on the reception quality being below the threshold.

The QoS component 840 may identify that a reception quality of the multicast/broadcast traffic is below a threshold. In some cases, the threshold is associated with at least one of a block error rate, a received signal received power or received signal received quality measurement, or a dedicated establishment cause.

Figure 9:
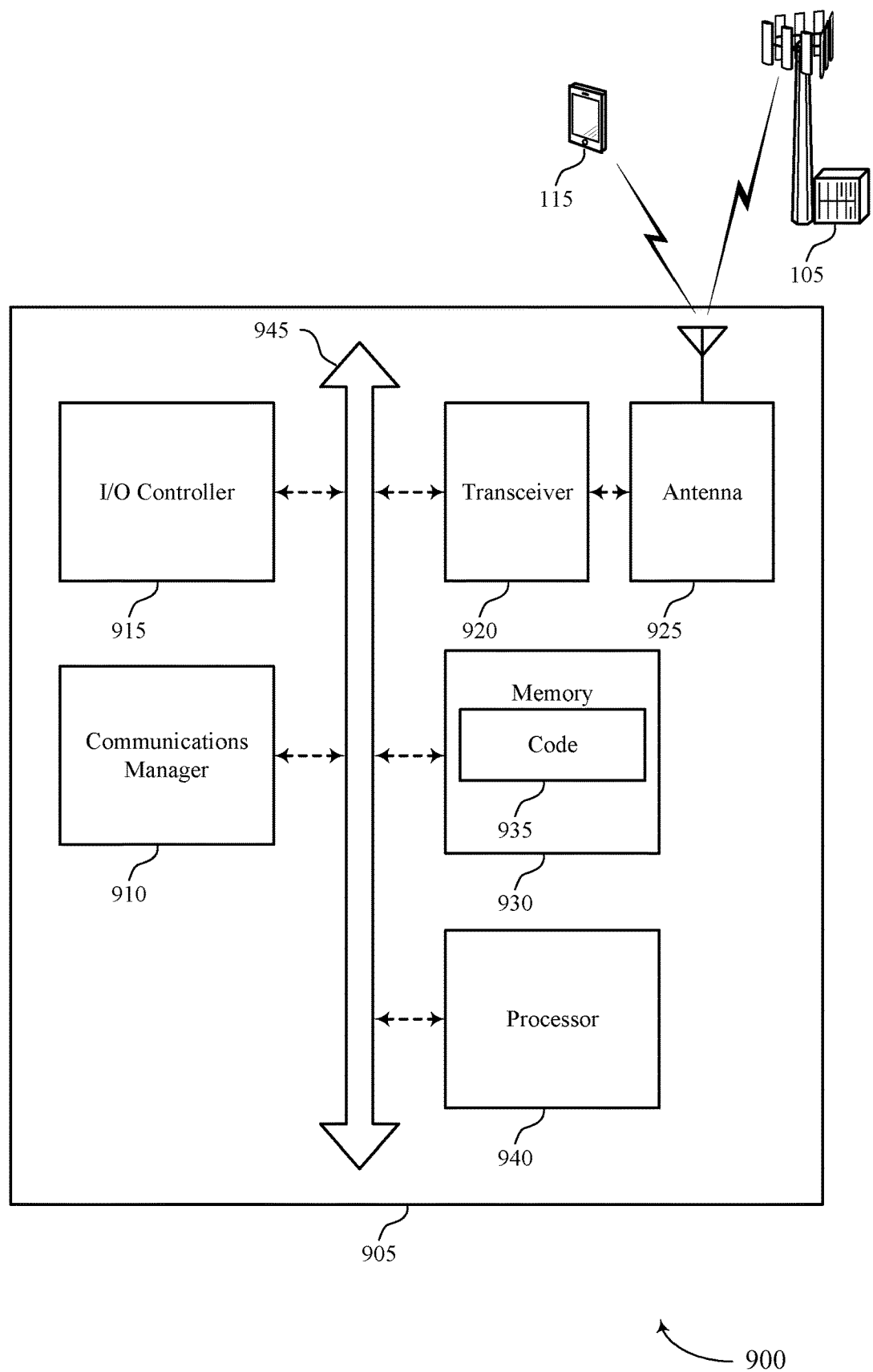
FIG. 9 shows a diagram of a system including a device that supports delivery of broadcast services using different broadcast/multicast radio bearer modes in accordance with aspects of the present disclosure.

FIG. 9 shows a diagram of a system 900 including a device 905 that supports delivery of broadcast services using different broadcast/multicast radio bearer modes in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a traffic indication that multicast/broadcast traffic is available for the UE, receive, from the base station, a state indication that identifies whether the UE is to be in a CONNECTED mode state in order to receive the multicast/broadcast traffic, and receive the multicast/broadcast traffic while in one of an IDLE, INACTIVE, or CONNECTED mode state, consistent with the state indication.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting delivery of broadcast services using different broadcast/multicast radio bearer modes).

The code 935 may include instructions to implement aspects of the present disclosure, including instructions to support wireless communication. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
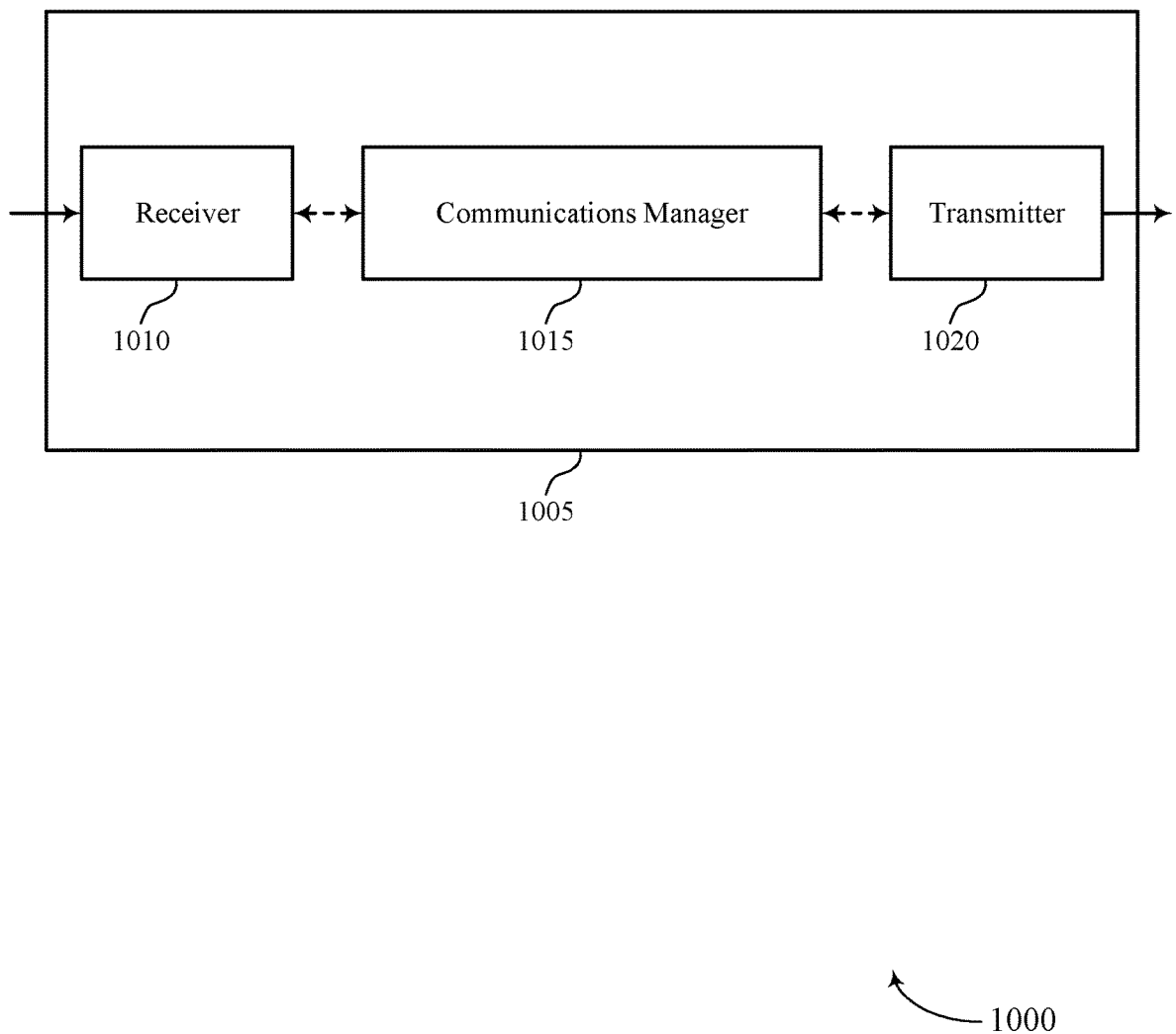
FIGS. 10 and 11 show block diagrams of devices that support delivery of broadcast services using different broadcast/multicast radio bearer modes in accordance with aspects of the present disclosure.

FIG. 10 shows a block diagram 1000 of a device 1005 that supports delivery of broadcast services using different broadcast/multicast radio bearer modes in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to delivery of broadcast services using different broadcast/multicast radio bearer modes, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, at the base station, an indication from a core network to serve multicast/broadcast traffic to one or more user equipment (UEs), select a radio bearer mode from a set of radio bearer modes for delivery of the multicast/broadcast traffic to at least one UE of the one or more UEs, where the selecting is based on the indication, and transmit the multicast/broadcast traffic to the at least one UE using the selected radio bearer mode. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Based on implementing the multicast/broadcast communication techniques as described herein, a processor of a UE 115 (e.g., controlling the receiver 1010, the transmitter 1020, or the transceiver 1320 as described with reference to FIG. 13) may increase reliability and decrease signaling overhead in the reception of multicast/broadcast traffic because the traffic may be communicated according to QoS levels associated with the traffic. Because the UE 115 may receive the traffic in accordance with a QoS service level, retransmissions and dropped communications may be reduces, which may enhance battery life and communication efficiencies.

Figure 11:
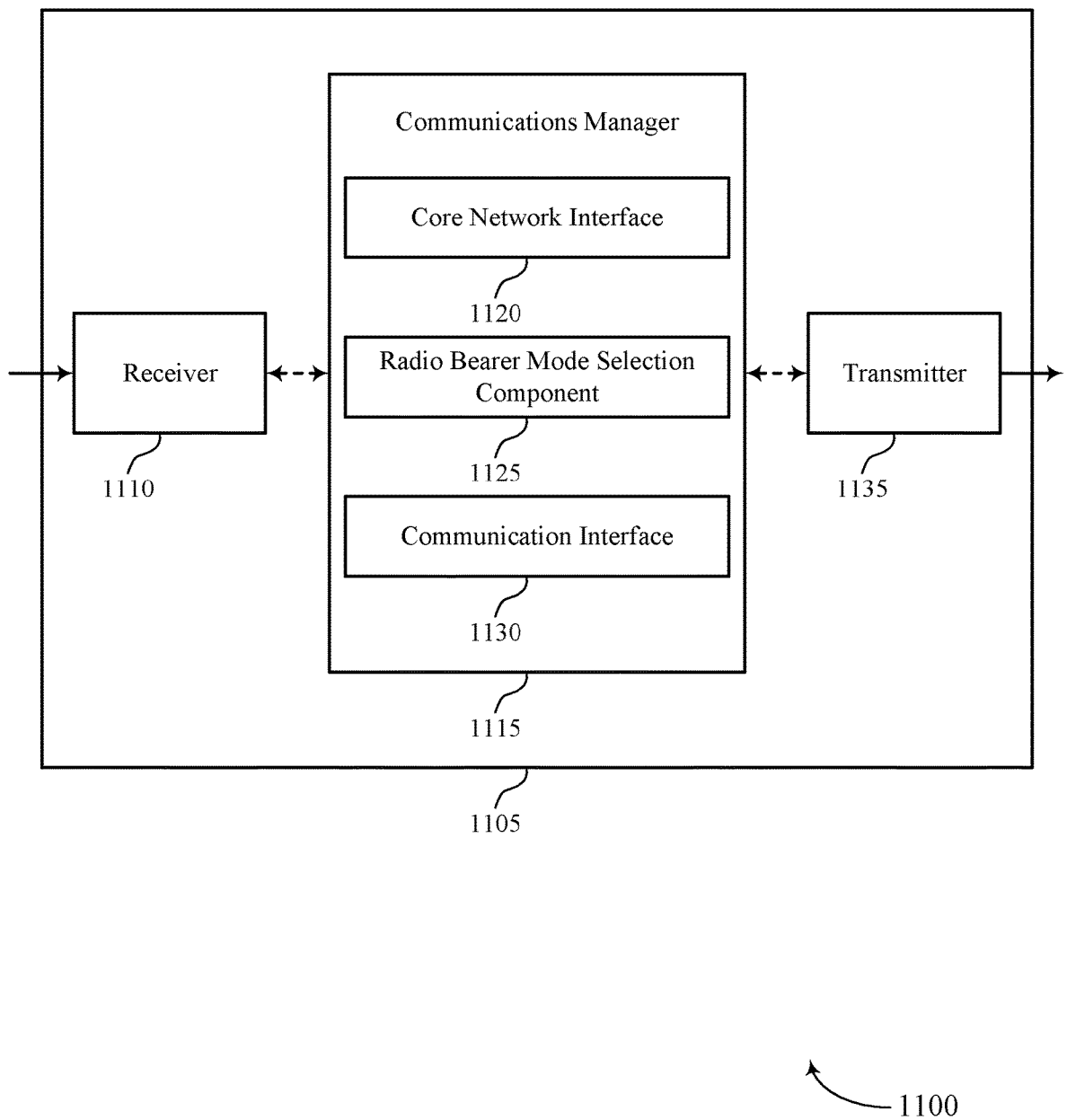

FIG. 11 shows a block diagram 1100 of a device 1105 that supports delivery of broadcast services using different broadcast/multicast radio bearer modes in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to delivery of broadcast services using different broadcast/multicast radio bearer modes, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a core network interface 1120, a radio bearer mode selection component 1125, and a communication interface 1130. The communications manager 1115 may be an example of aspects of the communications manager 1310 described herein.

The core network interface 1120 may receive, at the base station, an indication from a core network to serve multicast/broadcast traffic to one or more user equipment (UEs).

The radio bearer mode selection component 1125 may select a radio bearer mode from a set of radio bearer modes for delivery of the multicast/broadcast traffic to at least one UE of the one or more UEs, where the selecting is based on the indication. The communication interface 1130 may transmit the multicast/broadcast traffic to the at least one UE using the selected radio bearer mode.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
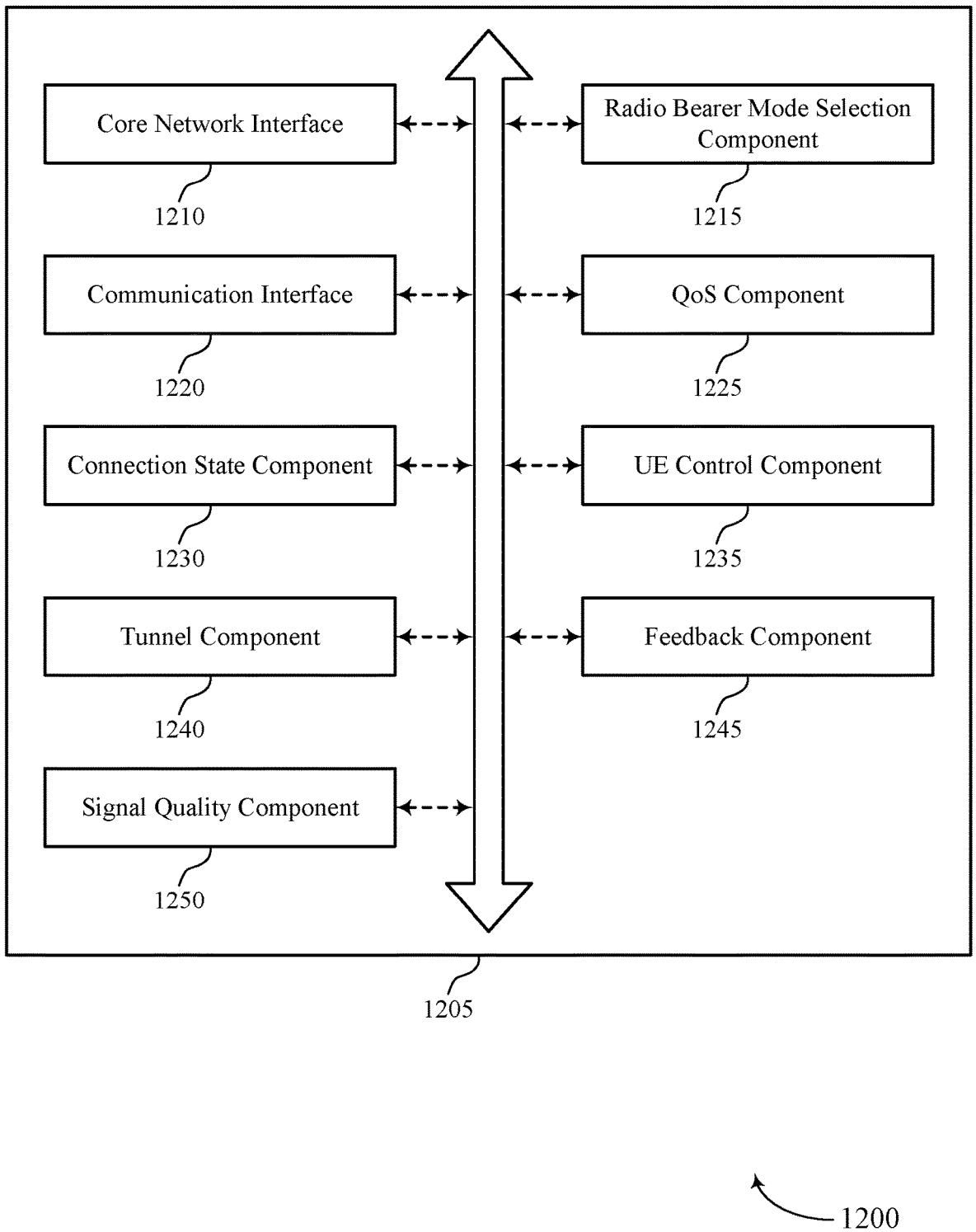
FIG. 12 shows a block diagram of a communications manager that supports delivery of broadcast services using different broadcast/multicast radio bearer modes in accordance with aspects of the present disclosure.

FIG. 12 shows a block diagram 1200 of a communications manager 1205 that supports delivery of broadcast services using different broadcast/multicast radio bearer modes in accordance with aspects of the present disclosure. The communications manager 1205 may be an example of aspects of a communications manager 1015, a communications manager 1115, or a communications manager 1310 described herein. The communications manager 1205 may include a core network interface 1210, a radio bearer mode selection component 1215, a communication interface 1220, a QoS component 1225, a connection state component 1230, a UE control component 1235, a tunnel component 1240, a feedback component 1245, and a signal quality component 1250. Each of these modules may communicate, directly or indirectly, with one another (e.g., via one or more buses).

The core network interface 1210 may receive, at the base station, an indication from a core network to serve multicast/broadcast traffic to one or more user equipment (UEs). In some examples, the core network interface 1210 may receive a UE connection state indicator from the core network.

In some examples, the core network interface 1210 may receive an indication from the core network that the at least one UE is to be in a CONNECTED mode only state in order to receive the multicast/broadcast traffic. In some examples, the core network interface 1210 may receive an indication from the core network that the multicast/broadcast N3 tunnel is for the multicast/broadcast only mode.

The radio bearer mode selection component 1215 may select a radio bearer mode from a set of radio bearer modes for delivery of the multicast/broadcast traffic to at least one UE of the one or more UEs, where the selecting is based on the indication.

In some examples, the radio bearer mode selection component 1215 may identify that the selected radio bearer mode is one of a multicast/broadcast only mode or a mixed multicast/broadcast and unicast mode. In some examples, the radio bearer mode selection component 1215 may identify that the selected radio bearer mode is a mixed multicast/broadcast and unicast mode.

In some examples, the radio bearer mode selection component 1215 may determine to use one of a multicast/broadcast mode or a unicast mode for retransmitting the multicast/broadcast traffic to the UE. In some examples, the radio bearer mode selection component 1215 may switch from use of a multicast radio bearer to a dedicated radio bearer for retransmission of the multicast/broadcast traffic to the UE.

In some examples, the radio bearer mode selection component 1215 may switch from use of a dedicated radio bearer to a multicast radio bearer for retransmission of the multicast/broadcast traffic to the UE. In some examples, the radio bearer mode selection component 1215 may identify that the selected radio bearer mode is a multicast/broadcast only mode.

The communication interface 1220 may transmit the multicast/broadcast traffic to the at least one UE using the selected radio bearer mode. In some examples, the communication interface 1220 may transmit the multicast/broadcast traffic to the at least one UE using a multicast/broadcast transmission based on the selected radio bearer mode being the mixed multicast/broadcast and unicast mode.

In some examples, the communication interface 1220 may transmit the multicast/broadcast traffic to the at least one UE using a unicast transmission based on the selected radio bearer mode being the mixed multicast/broadcast and unicast mode. In some examples, the communication interface 1220 may retransmit the multicast/broadcast traffic to the UE using the determined mode.

In some examples, the communication interface 1220 may transmit the multicast/broadcast traffic to the at least one UE using a multicast/broadcast transmission based on the selected radio bearer mode being the multicast/broadcast only mode. In some examples, the communication interface 1220 may retransmit the multicast/broadcast traffic to the UE using a unicast transmission mode.

The QoS component 1225 may identify that the multicast/broadcast traffic is associated with a quality of service flow type. In some examples, the QoS component 1225 may identify a quality of service flow identifier associated with the quality of service flow type.

The connection state component 1230 may determine a UE connection state for receiving the multicast/broadcast traffic, the UE connection state being determined based on the quality of service flow type associated with the multicast/broadcast traffic.

In some examples, the connection state component 1230 may identify that the UE connection state is a CONNECTED mode only state based on the quality of service flow identifier. In some examples, the connection state component 1230 may identify that the UE connection state is a CONNECTED mode only state based on the UE connection state indicator.

In some examples, the connection state component 1230 may determine, based on the selected radio bearer mode being the mixed multicast/broadcast and unicast mode, that the at least one UE is to be in a CONNECTED mode only state in order to receive the multicast/broadcast traffic. In some examples, the connection state component 1230 may determine, based on the selected radio bearer mode being the multicast/broadcast only mode, that the at least one UE is to be in any of an IDLE, INACTIVE, or CONNECTED mode state in order to receive the multicast/broadcast traffic.

In some examples, the connection state component 1230 may receive an indication from the core network that the one or more UEs are to be in any of an IDLE, INACTIVE, or CONNECTED mode state in order to receive the multicast/broadcast traffic.

In some examples, the connection state component 1230 may determine, based on the HARQ feedback, that the multicast/broadcast traffic is to be retransmitted to a UE in the CONNECTED mode state. In some cases, the UE connection state is one of a CONNECTED mode only state, or any of IDLE, INACTIVE, or CONNECTED mode states. The UE control component 1235 may indicate to the at least one UE the UE connection state to be used in order to receive the multicast/broadcast traffic.

In some examples, the UE control component 1235 may transmit a wake up message to trigger the at least one UE to transition to a CONNECTED mode state in order to receive the multicast/broadcast traffic, where the wake up message is a per multicast/broadcast quality of service flow message.

In some examples, the UE control component 1235 may transmit a broadcast page to trigger the at least one UE to transition to CONNECTED mode in order to receive the multicast/broadcast traffic.

In some examples, the UE control component 1235 may transmit a service announcement to the at least one UE in a multicast/broadcast service area via a multicast control channel in order to trigger the at least one UE to transition to CONNECTED mode in order to receive the multicast/broadcast traffic.

In some examples, the UE control component 1235 may indicate to the UE that retransmission of the multicast/broadcast traffic is to be via a different type of radio bearer than was used for the transmission of the multicast/broadcast traffic. In some examples, the UE control component 1235 may indicate to the UE is via either a RRC message or a MAC control element (CE). In some examples, the UE control component 1235 may configure, via non-UE specific signaling on a multicast control channel message, a multicast radio bearer to carry the multicast/broadcast traffic to the at least one UE.

In some examples, the UE control component 1235 may indicate a change in a configuration of the multicast radio bearer to the at least one UE via a multicast control channel change notification, where the change is indicated in a multicast radio bearer-specific field in the multicast control channel change notification.

In some cases, the multicast/broadcast service area encompasses a multicast/broadcast wake up area that is based on an indication by a session management function (SMF). The tunnel component 1240 may establish a multicast/broadcast N3 tunnel with a multicast/broadcast user plane function (UPF) in order to receive the multicast/broadcast traffic from the multicast/broadcast UPF.

In some examples, the tunnel component 1240 may establish a multicast/broadcast N3 tunnel with a multicast/broadcast user plane function (UPF) in order to receive the multicast/broadcast traffic from the multicast/broadcast UPF, where the multicast/broadcast N3 tunnel is one of multiple multicast/broadcast N3 tunnels for delivery of the multicast/broadcast traffic by the multicast/broadcast UPF within a broadcast service area.

The feedback component 1245 may receive, from a UE of the at least one UE, a HARQ feedback associated with the multicast/broadcast traffic.

In some examples, the feedback component 1245 may determine, based on the HARQ feedback, that the multicast/broadcast traffic is to be retransmitted to the UE. In some examples, the feedback component 1245 may receive a packet data convergence protocol (PDCP) or RLC status feedback message from a UE of the at least one UE.

In some examples, the feedback component 1245 may receive, from only UEs in a CONNECTED mode state of the at least one UE, at least one of a HARQ feedback associated with the multicast/broadcast traffic or a channel state information report.

The signal quality component 1250 may improve a receive quality of the multicast/broadcast traffic when a UE of the at least one UE is in an IDLE mode state, where the receive quality is improved using at least one of a lower modulation and coding scheme or a higher redundancy level with respect to transmissions where the at least one UE is in a CONNECTED mode state.

Figure 13:
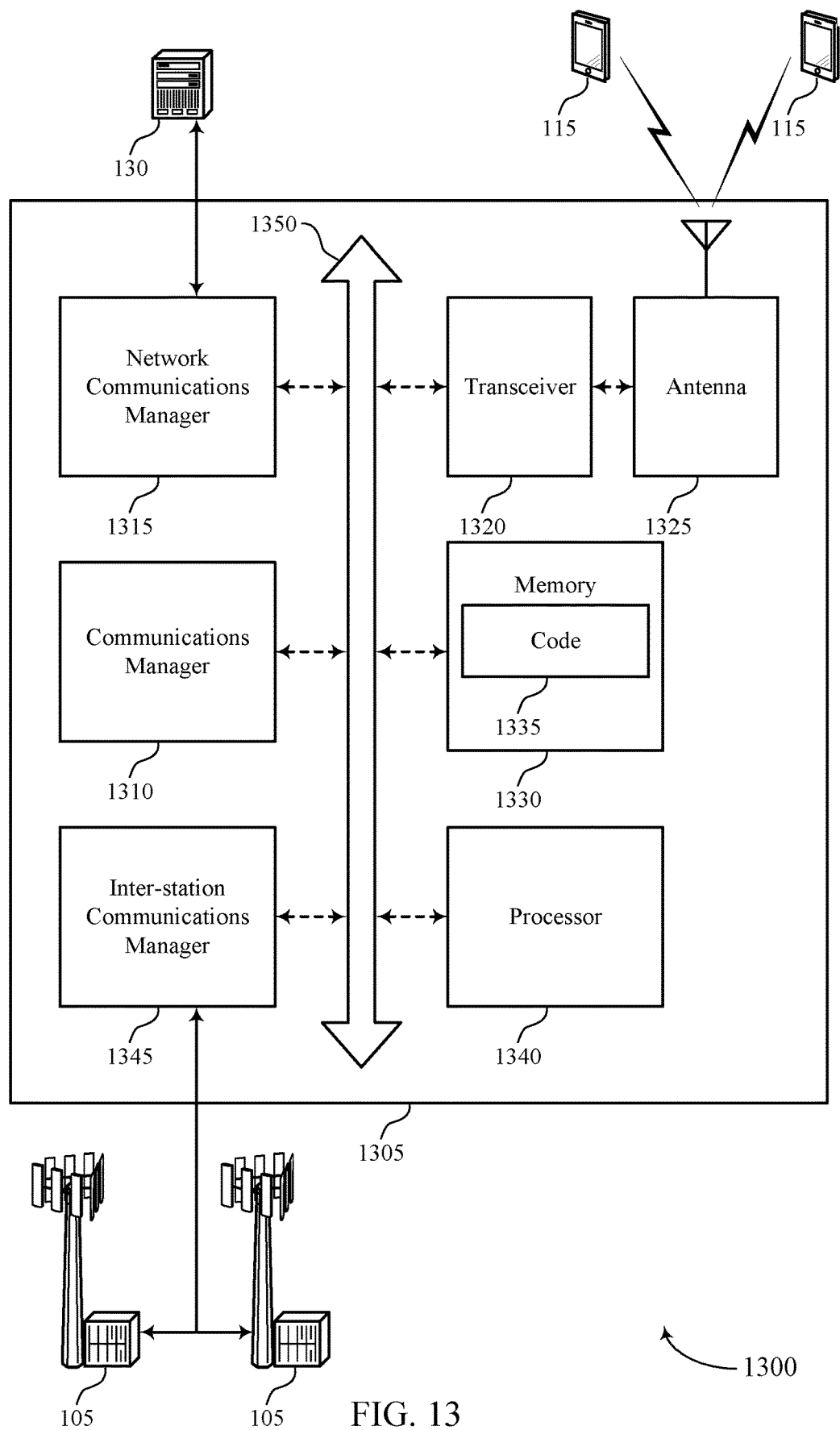
FIG. 13 shows a diagram of a system including a device that supports delivery of broadcast services using different broadcast/multicast radio bearer modes in accordance with aspects of the present disclosure.

FIG. 13 shows a diagram of a system 1300 including a device 1305 that supports delivery of broadcast services using different broadcast/multicast radio bearer modes in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, at the base station, an indication from a core network to serve multicast/broadcast traffic to one or more user equipment (UEs), select a radio bearer mode from a set of radio bearer modes for delivery of the multicast/broadcast traffic to at least one UE of the one or more UEs, where the selecting is based on the indication, and transmit the multicast/broadcast traffic to the at least one UE using the selected radio bearer mode.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting delivery of broadcast services using different broadcast/multicast radio bearer modes).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communication. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
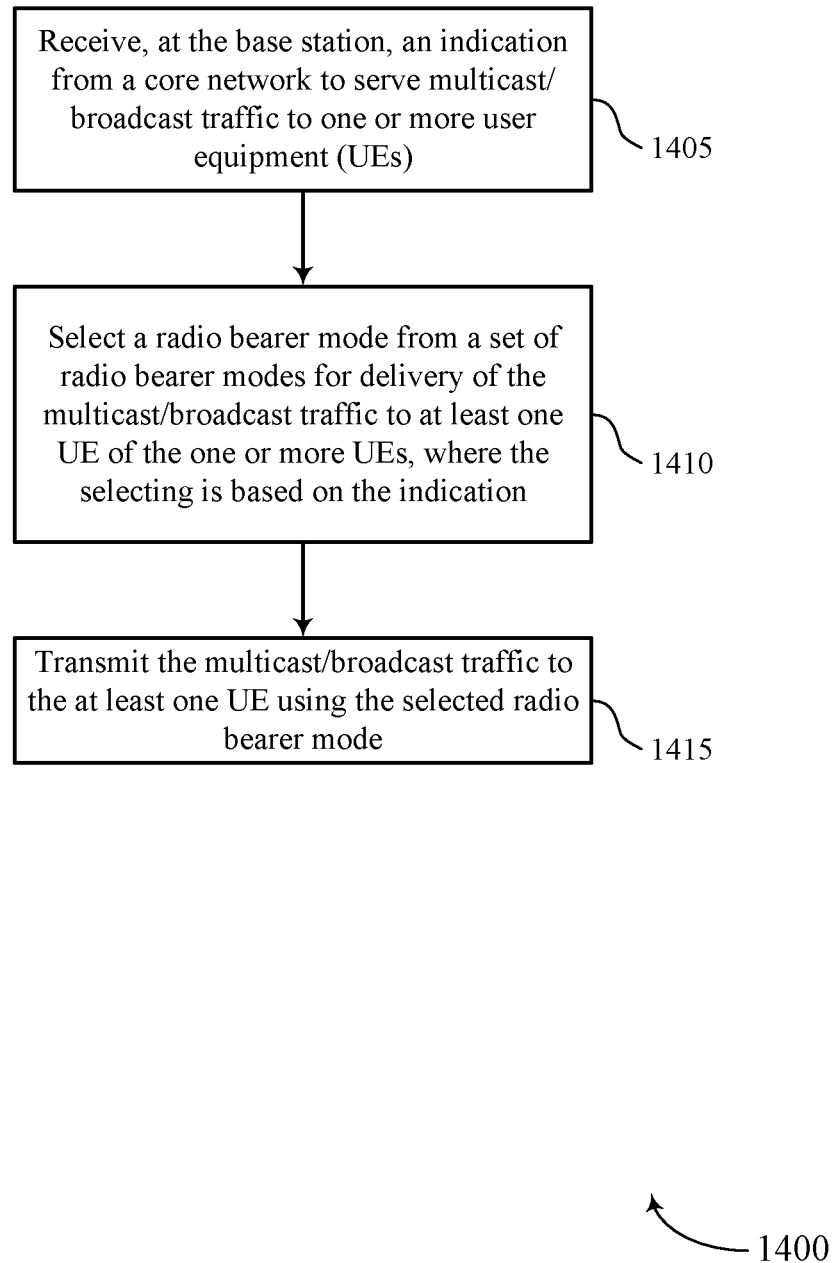
FIGS. 14 through 17 show flowcharts illustrating methods that support delivery of broadcast services using different broadcast/multicast radio bearer modes in accordance with aspects of the present disclosure.

FIG. 14 shows a flowchart illustrating a method 1400 that supports delivery of broadcast services using different broadcast/multicast radio bearer modes in accordance with aspects of the present disclosure. The operations of method 1400 may be implemented by a base station 105 or its components as described herein. For example, the operations of method 1400 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1405, the base station may receive, at the base station, an indication from a core network to serve multicast/broadcast traffic to one or more user equipment (UEs). The operations of 1405 may be performed according to the methods described herein. In some examples, aspects of the operations of 1405 may be performed by a core network interface as described with reference to FIGS. 10 through 13.

At 1410, the base station may select a radio bearer mode from a set of radio bearer modes for delivery of the multicast/broadcast traffic to at least one UE of the one or more UEs, where the selecting is based on the indication. The operations of 1410 may be performed according to the methods described herein. In some examples, aspects of the operations of 1410 may be performed by a radio bearer mode selection component as described with reference to FIGS. 10 through 13.

At 1415, the base station may transmit the multicast/broadcast traffic to the at least one UE using the selected radio bearer mode. The operations of 1415 may be performed according to the methods described herein. In some examples, aspects of the operations of 1415 may be performed by a communication interface as described with reference to FIGS. 10 through 13.

Figure 15:
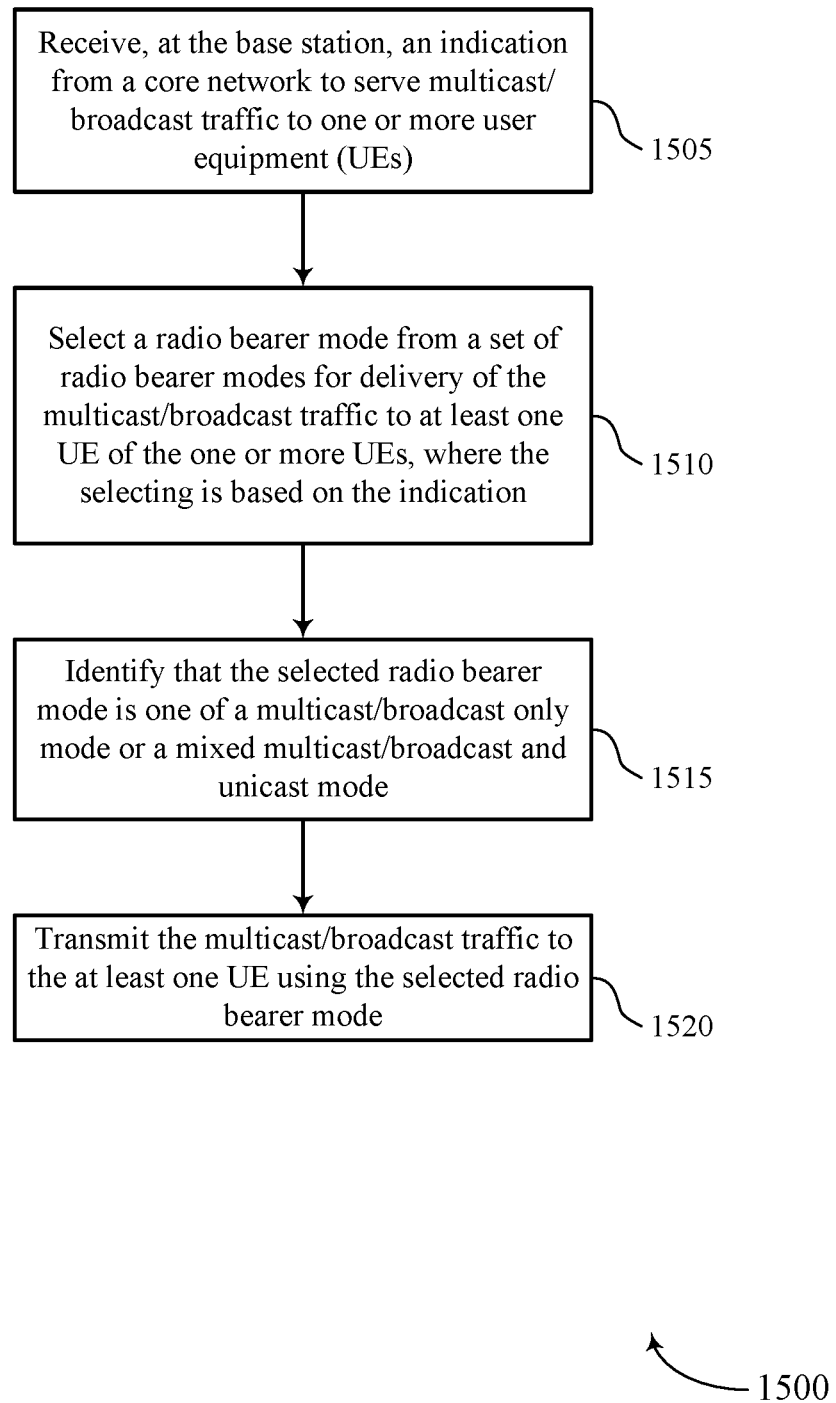

FIG. 15 shows a flowchart illustrating a method 1500 that supports delivery of broadcast services using different broadcast/multicast radio bearer modes in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may receive, at the base station, an indication from a core network to serve multicast/broadcast traffic to one or more user equipment (UEs). The operations of 1505 may be performed according to the methods described herein. In some examples, aspects of the operations of 1505 may be performed by a core network interface as described with reference to FIGS. 10 through 13.

At 1510, the base station may select a radio bearer mode from a set of radio bearer modes for delivery of the multicast/broadcast traffic to at least one UE of the one or more UEs, where the selecting is based on the indication. The operations of 1510 may be performed according to the methods described herein. In some examples, aspects of the operations of 1510 may be performed by a radio bearer mode selection component as described with reference to FIGS. 10 through 13.

At 1515, the base station may identify that the selected radio bearer mode is one of a multicast/broadcast only mode or a mixed multicast/broadcast and unicast mode. The operations of 1515 may be performed according to the methods described herein. In some examples, aspects of the operations of 1515 may be performed by a radio bearer mode selection component as described with reference to FIGS. 10 through 13.

At 1520, the base station may transmit the multicast/broadcast traffic to the at least one UE using the selected radio bearer mode. The operations of 1520 may be performed according to the methods described herein. In some examples, aspects of the operations of 1520 may be performed by a communication interface as described with reference to FIGS. 10 through 13.

Figure 16:
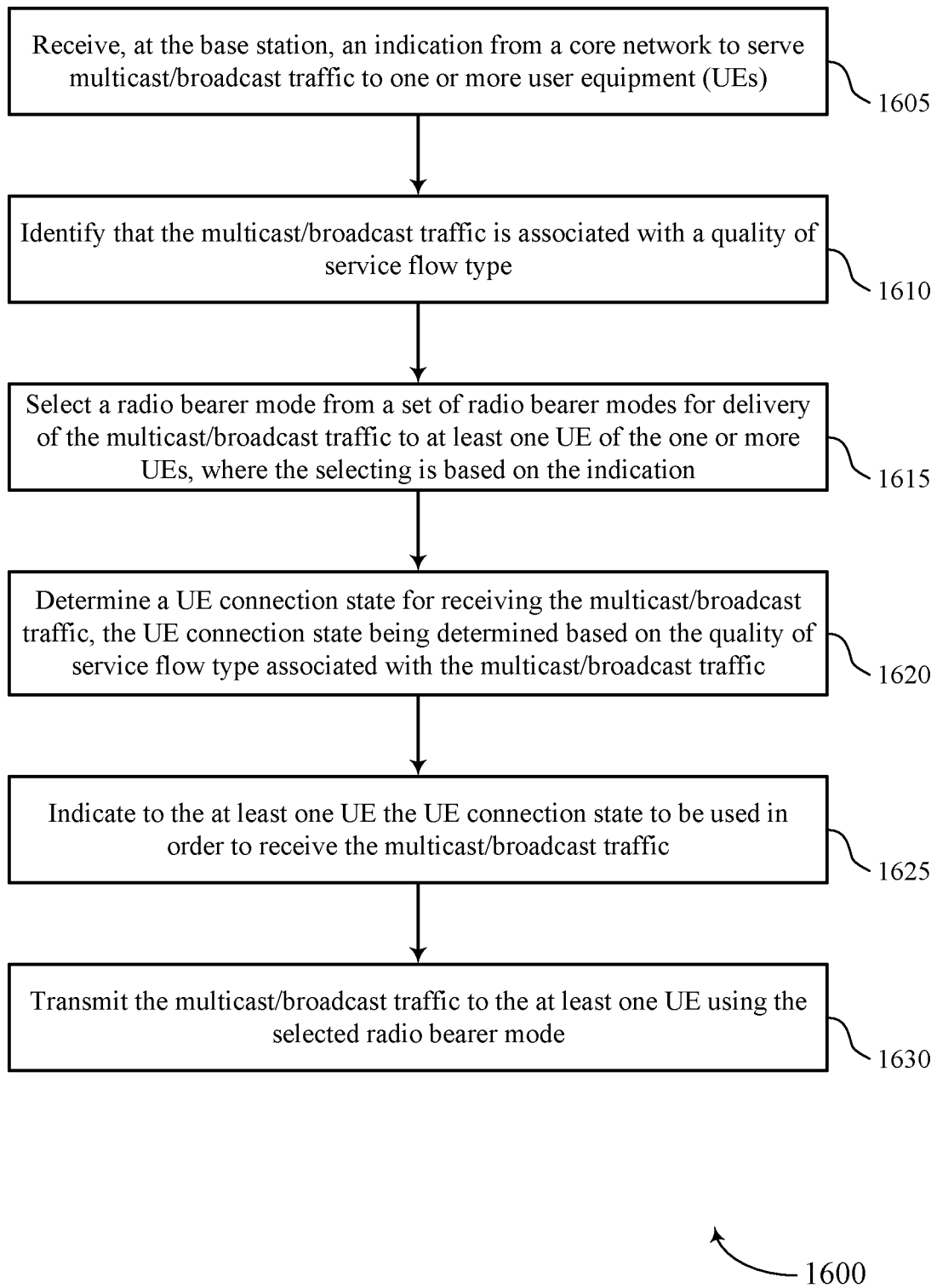

FIG. 16 shows a flowchart illustrating a method 1600 that supports delivery of broadcast services using different broadcast/multicast radio bearer modes in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may receive, at the base station, an indication from a core network to serve multicast/broadcast traffic to one or more user equipment (UEs). The operations of 1605 may be performed according to the methods described herein. In some examples, aspects of the operations of 1605 may be performed by a core network interface as described with reference to FIGS. 10 through 13.

At 1610, the base station may identify that the multicast/broadcast traffic is associated with a quality of service flow type. The operations of 1610 may be performed according to the methods described herein. In some examples, aspects of the operations of 1610 may be performed by a QoS component as described with reference to FIGS. 10 through 13.

At 1615, the base station may select a radio bearer mode from a set of radio bearer modes for delivery of the multicast/broadcast traffic to at least one UE of the one or more UEs, where the selecting is based on the indication. The operations of 1615 may be performed according to the methods described herein. In some examples, aspects of the operations of 1615 may be performed by a radio bearer mode selection component as described with reference to FIGS. 10 through 13.

At 1620, the base station may determine a UE connection state for receiving the multicast/broadcast traffic, the UE connection state being determined based on the quality of service flow type associated with the multicast/broadcast traffic. The operations of 1620 may be performed according to the methods described herein. In some examples, aspects of the operations of 1620 may be performed by a connection state component as described with reference to FIGS. 10 through 13.

At 1625, the base station may indicate to the at least one UE the UE connection state to be used in order to receive the multicast/broadcast traffic. The operations of 1625 may be performed according to the methods described herein. In some examples, aspects of the operations of 1625 may be performed by a UE control component as described with reference to FIGS. 10 through 13.

At 1630, the base station may transmit the multicast/broadcast traffic to the at least one UE using the selected radio bearer mode. The operations of 1630 may be performed according to the methods described herein. In some examples, aspects of the operations of 1630 may be performed by a communication interface as described with reference to FIGS. 10 through 13.

Figure 17:
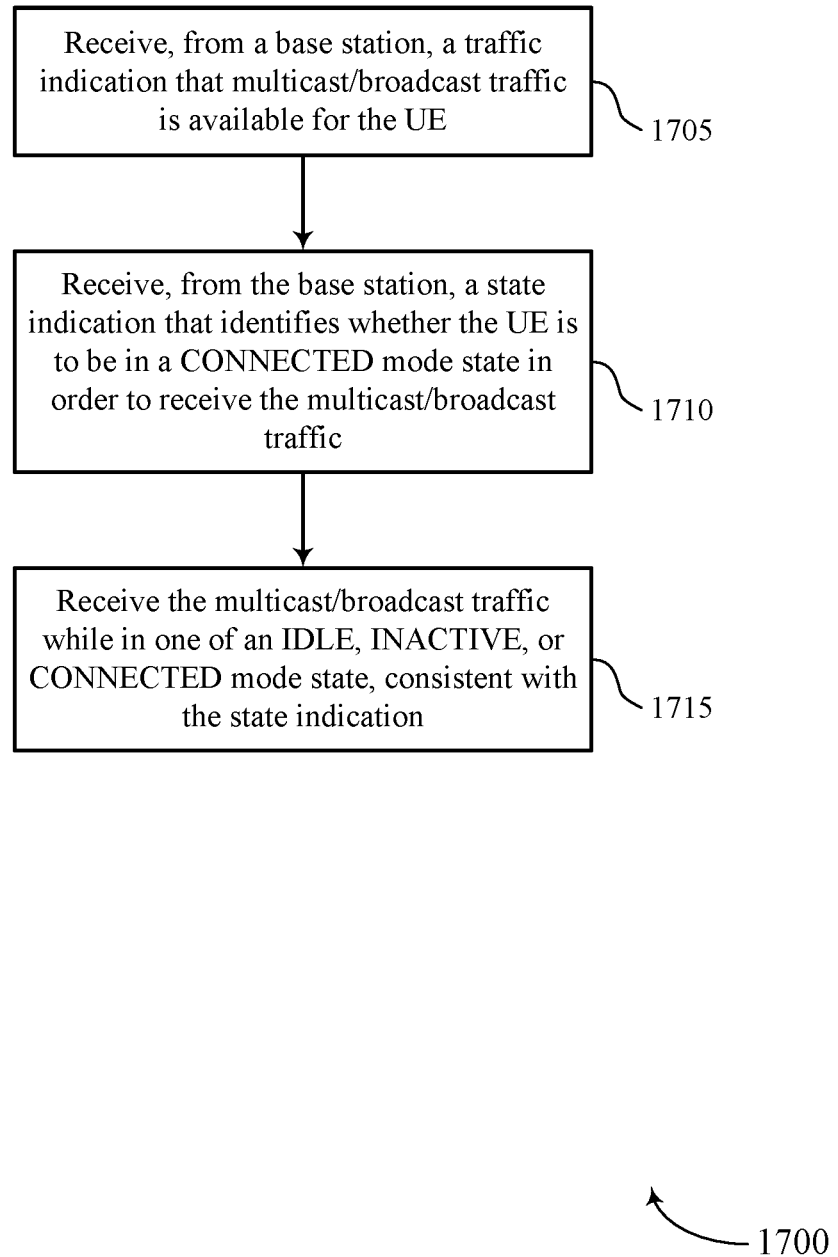

FIG. 17 shows a flowchart illustrating a method 1700 that supports delivery of broadcast services using different broadcast/multicast radio bearer modes in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a traffic indication that multicast/broadcast traffic is available for the UE. The operations of 1705 may be performed according to the methods described herein. In some examples, aspects of the operations of 1705 may be performed by a traffic indication component as described with reference to FIGS. 6 through 9.

At 1710, the UE may receive, from the base station, a state indication that identifies whether the UE is to be in a CONNECTED mode state in order to receive the multicast/broadcast traffic. The operations of 1710 may be performed according to the methods described herein. In some examples, aspects of the operations of 1710 may be performed by a state indication component as described with reference to FIGS. 6 through 9.

At 1715, the UE may receive the multicast/broadcast traffic while in one of an IDLE, INACTIVE, or CONNECTED mode state, consistent with the state indication. The operations of 1715 may be performed according to the methods described herein. In some examples, aspects of the operations of 1715 may be performed by a communication interface as described with reference to FIGS. 6 through 9.

The following provides an overview of examples of the present disclosure:

Example 1: A method for wireless communication at a base station, comprising: receiving, at the base station, an indication from a core network to serve multicast/broadcast traffic to one or more user equipment (UEs); selecting a radio bearer mode from a plurality of radio bearer modes for delivery of the multicast/broadcast traffic to at least one UE of the one or more UEs, wherein the selecting is based at least in part on the indication; and transmitting the multicast/broadcast traffic to the at least one UE using the selected radio bearer mode.

Example 2: The method of example 1, wherein selecting the radio bearer mode comprises: identifying that the selected radio bearer mode is one of a multicast/broadcast only mode or a mixed multicast/broadcast and unicast mode.

Example 3: The method of any of examples 1 and 2, further comprising: identifying that the multicast/broadcast traffic is associated with a quality of service flow type; determining a UE connection state for receiving the multicast/broadcast traffic, the UE connection state being determined based at least in part on the quality of service flow type associated with the multicast/broadcast traffic; and indicating to the at least one UE the UE connection state to be used in order to receive the multicast/broadcast traffic.

Example 4: The method of example 3, wherein identifying that the multicast/broadcast traffic is associated with the quality of service flow type comprises: identifying a quality of service flow identifier associated with the quality of service flow type; and identifying that the UE connection state is a CONNECTED mode only state based at least in part on the quality of service flow identifier.

Example 5: The method of example 3, wherein determining the UE connection state comprises: receiving a UE connection state indicator from the core network; and identifying that the UE connection state is a CONNECTED mode only state based at least in part on the UE connection state indicator.

Example 6: The method of any of examples 2 to 5, wherein selecting the radio bearer mode comprises: identifying that the selected radio bearer mode is a mixed multicast/broadcast and unicast mode.

Example 7: The method of example 6, wherein receiving the indication to serve the multicast/broadcast traffic to the one or more UEs comprises: establishing a multicast/broadcast N3 tunnel with a multicast/broadcast user plane function (UPF) in order to receive the multicast/broadcast traffic from the multicast/broadcast UPF.

Example 8: The method of any of examples 6 and 7, further comprising: transmitting the multicast/broadcast traffic to the at least one UE using a multicast/broadcast transmission or a unicast transmission based at least in part on the selected radio bearer mode being the mixed multicast/broadcast and unicast mode.

Example 9: The method of any of examples 6 to 8, further comprising: determining, based on the selected radio bearer mode being the mixed multicast/broadcast and unicast mode, that the at least one UE is to be in a CONNECTED mode only state in order to receive the multicast/broadcast traffic.

Example 10: The method of any of examples 6 to 9, further comprising: receiving an indication from the core network that the at least one UE is to be in a CONNECTED mode only state in order to receive the multicast/broadcast traffic.

Example 11: The method of any of examples 6 to 10, further comprising: transmitting a wake up message to trigger the at least one UE to transition to a CONNECTED mode state in order to receive the multicast/broadcast traffic, wherein the wake up message is a per multicast/broadcast quality of service flow message.

Example 12: The method of any of examples 6 to 10, further comprising: transmitting a broadcast page to trigger the at least one UE to transition to CONNECTED mode in order to receive the multicast/broadcast traffic.

Example 13: The method of any of examples 6 to 10, further comprising: transmitting a service announcement to the at least one UE in a multicast/broadcast service area via a multicast control channel in order to trigger the at least one UE to transition to CONNECTED mode in order to receive the multicast/broadcast traffic.

Example 14: The method of any of examples 6 to 13, further comprising: receiving, from a UE of the at least one UE, a hybrid automatic repeat request (HARQ) feedback associated with the multicast/broadcast traffic.

Example 15: The method of example 14, further comprising: determining, based at least in part on the HARQ feedback, that the multicast/broadcast traffic is to be retransmitted to the UE; determining to use one of a multicast/broadcast mode or a unicast mode for retransmitting the multicast/broadcast traffic to the UE; and retransmitting the multicast/broadcast traffic to the UE using the determined mode.

Example 16: The method of example 15, further comprising: switching from use of a multicast radio bearer to a dedicated radio bearer or from use of a dedicated radio bearer to a multicast radio bearer for retransmission of the multicast/broadcast traffic to the UE.

Example 17: The method of any of examples 15 and 16, further comprising: indicating to the UE that retransmission of the multicast/broadcast traffic is to be via a different type of radio bearer than was used for the transmission of the multicast/broadcast traffic.

Example 18: The method of example 17, wherein: indicating to the UE is via either a radio resource control (RRC) message or a media access control (MAC) control element (CE).

Example 19: The method of any of examples 1 to 5, wherein selecting the radio bearer mode comprises: identifying that the selected radio bearer mode is a multicast/broadcast only mode.

Example 20: The method of example 19, wherein receiving the indication to serve the multicast/broadcast traffic to the one or more UEs comprises: establishing a multicast/broadcast N3 tunnel with a multicast/broadcast user plane function (UPF) in order to receive the multicast/broadcast traffic from the multicast/broadcast UPF, wherein the multicast/broadcast N3 tunnel is one of multiple multicast/broadcast N3 tunnels for delivery of the multicast/broadcast traffic by the multicast/broadcast UPF within a broadcast service area.

Example 21: The method of example 20, further comprising: receiving an indication from the core network that the multicast/broadcast N3 tunnel is for the multicast/broadcast only mode.

Example 22: The method of any of examples 19 to 21, further comprising: transmitting the multicast/broadcast traffic to the at least one UE using a multicast/broadcast transmission based at least in part on the selected radio bearer mode being the multicast/broadcast only mode.

Example 23: The method of any of examples 19 to 22, further comprising: determining, based on the selected radio bearer mode being the multicast/broadcast only mode, that the at least one UE is to be in any of an IDLE, INACTIVE, or CONNECTED mode state in order to receive the multicast/broadcast traffic.

Example 24: The method of any of examples 19 to 23, further comprising: receiving an indication from the core network that the one or more UEs are to be in any of an IDLE, INACTIVE, or CONNECTED mode state in order to receive the multicast/broadcast traffic.

Example 25: The method of any of examples 19 to 24, further comprising: configuring, via non-UE specific signaling on a multicast control channel message, a multicast radio bearer to carry the multicast/broadcast traffic to the at least one UE.

Example 26: The method of any of examples 19 to 25, further comprising: improving a receive quality of the multicast/broadcast traffic when a UE of the at least one UE is in an IDLE mode state, wherein the receive quality is improved using at least one of a lower modulation and coding scheme or a higher redundancy level with respect to transmissions where the at least one UE is in a CONNECTED mode state.

Example 27: The method of any of examples 19 to 26, further comprising: receiving, from only UEs in a CONNECTED mode state of the at least one UE, at least one of a hybrid automatic repeat request (HARQ) feedback associated with the multicast/broadcast traffic or a channel state information report; receiving, from only UEs in a CONNECTED mode state of the at least one UE, at least one of a hybrid automatic repeat request (HARQ) feedback associated with the multicast/broadcast traffic or a channel state information report; determining, based at least in part on the HARQ feedback, that the multicast/broadcast traffic is to be retransmitted to a UE in the CONNECTED mode state; and retransmitting the multicast/broadcast traffic to the UE using a unicast transmission mode.

Example 28: The method of any of examples 1 through 26, wherein the UE connection state is one of a CONNECTED mode only state, or any of IDLE, INACTIVE, or CONNECTED mode states.

Example 29: The method of any of examples 15 and 16, wherein the multi-cast/broadcast service area encompasses a multicast/broadcast wake-up area that is based at least in part on an indication by a session management function (SMF).

Example 30: The method of any of examples 7 to 18, further comprising: receiving a packet data convergence protocol (PDCP) or radio link control (RLC) status feedback message from a UE of the at least one UE.

Example 31: The method of any of examples 19 to 27, further comprising: indicating a change in a configuration of the multicast radio bearer to the at least one UE via a multicast control channel change notification, wherein the change is indicated in a multicast radio bearer-specific field in the multicast control channel change notification.

Example 32: A method of wireless communications at a user equipment (UE), comprising: receiving, from a base station, a traffic indication that multicast/broadcast traffic is available for the UE; receiving, from the base station, a state indication that identifies whether the UE is to be in a CONNECTED mode state in order to receive the multicast/broadcast traffic; and receiving the multicast/broadcast traffic while in one of an IDLE, INACTIVE, or CONNECTED mode state, consistent with the state indication.

Example 33: The method of example 32, wherein receiving the state indication comprises: receiving a wake up message to trigger the UE to transition from an IDLE mode state to the CONNECTED mode state in order to receive the multicast/broadcast traffic, wherein the wake up message is a per multicast/broadcast quality of service flow message.

Example 34: The method of example 32, wherein receiving the state indication comprises: receiving a broadcast page to trigger the UE to transition from an IDLE mode state to the CONNECTED mode state in order to receive the multicast/broadcast traffic.

Example 35: The method of example 33, wherein receiving the state indication comprises: monitoring a multicast control channel; and receiving a service announcement transmitted by the base station to UEs in a multicast/broadcast service area via the multicast control channel in order to trigger the UE to transition from an IDLE mode state to the CONNECTED mode state in order to receive the multicast/broadcast traffic.

Example 36: The method of example 35, wherein the multicast/broadcast service area encompasses a multicast/broadcast wake up area that is based at least in part on an indication by a session management function (SMF).

Example 37: The method of any of examples 35 and 36, wherein monitoring the multicast control channel is periodic based on at least one of a broadcast discontinuous reception cycle configuration or a multicast control channel change period.

Example 38: The method of any of examples 32 to 37, further comprising: receiving the multicast/broadcast traffic via a multicast radio bearer; transmitting, in response to reception of the multicast/broadcast traffic, a hybrid automatic repeat request (HARM) feedback; receiving a transmission mode indication that the multicast/broadcast traffic is to be retransmitted using a dedicated radio bearer; and receiving a retransmission of the multicast/broadcast traffic via the dedicated radio bearer.

Example 39: The method of example 38, wherein the transmission mode indication is received via either a radio resource control (RRC) message or a media access control (MAC) control element (CE).

Example 40: The method of any of examples 32 to 39, further comprising: receiving the multicast/broadcast traffic via a multicast radio bearer; and transmitting a packet data convergence protocol (PDCP) or radio link control (RLC) status feedback message to the base station.

Example 41: The method of any of examples 32 to 40, wherein the multicast/broadcast traffic is received while the UE is in an IDLE mode state.

Example 42: The method of any of examples 32 to 41, further comprising: receiving a multicast radio bearer configuration via non-UE specific signaling on a multicast control channel message, wherein a multicast radio bearer is to carry the multicast/broadcast traffic to the UE.

Example 43: The method of any of examples 32 to 42, further comprising: receiving a multicast control channel change notification indicating a change in the multicast radio bearer configuration, wherein the change is indicated in a multicast radio bearer-specific field in the multicast control channel change notification.

Example 44: The method of any of examples 32 to 43, further comprising: identifying that the UE is not in a CONNECTED mode state when the UE receives the multicast/broadcast traffic via a multicast radio bearer; identifying that a reception quality of the multicast/broadcast traffic is below a threshold; and transitioning to a CONNECTED mode state for future reception of the multicast/broadcast traffic via the multicast radio bearer based at least in part on the reception quality being below the threshold.

Example 45: The method of example 44, wherein the threshold is associated with at least one of a block error rate, a received signal received power or received signal received quality measurement, or a dedicated establishment cause.

Example 46: An apparatus comprising at least one means for performing a method of any of examples 1 to 45.

Example 47: An apparatus for wireless communications comprising a processor; memory coupled with the processor; and instructions stored in the memory and executable by the processor to cause the apparatus to perform a method of any of examples 1 to 45.

Example 48: A non-transitory computer-readable medium storing code for wireless communications, the code comprising instructions executable by a processor to perform a method of any of examples 1 to 45.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a network device, comprising:
 receiving, at the network device, an indication from a core network to serve multicast/broadcast traffic to one or more user equipment (UEs);
 selecting a radio bearer mode from a first mode that uses both a multicast radio bearer and a dedicated radio bearer and a second mode that uses the multicast radio bearer for delivery of the multicast/broadcast traffic to at least one UE of the one or more UEs, wherein the selecting is based at least in part on the indication; and
 transmitting the multicast/broadcast traffic to the at least one UE using the selected radio bearer mode.

2. The method of claim 1, further comprising:
 identifying that the multicast/broadcast traffic is associated with a quality of service flow type;
 determining a UE connection state for receiving the multicast/broadcast traffic, the UE connection state being determined based at least in part on the quality of service flow type associated with the multicast/broadcast traffic; and
 indicating to the at least one UE the UE connection state to be used in order to receive the multicast/broadcast traffic.

3. The method of claim 2, wherein identifying that the multicast/broadcast traffic is associated with the quality of service flow type comprises:
 identifying a quality of service flow identifier associated with the quality of service flow type; and
 identifying that the UE connection state is a CONNECTED mode only state based at least in part on the quality of service flow identifier.

4. The method of claim 2, wherein determining the UE connection state comprises:
 receiving a UE connection state indicator from the core network; and
 identifying that the UE connection state is a CONNECTED mode only state based at least in part on the UE connection state indicator.

5. The method of claim 1, wherein selecting the radio bearer mode comprises:
 identifying that the selected radio bearer mode is the first mode that uses both the multicast radio bearer and the dedicated radio bearer.

6. The method of claim 5, wherein receiving the indication to serve the multicast/broadcast traffic to the one or more UEs comprises:
 establishing a multicast/broadcast N3 tunnel with a multicast/broadcast user plane function (UPF) in order to receive the multicast/broadcast traffic from the multicast/broadcast UPF.

7. The method of claim 5, further comprising:
 transmitting the multicast/broadcast traffic to the at least one UE using a multicast/broadcast transmission or a unicast transmission based at least in part on the selected radio bearer mode being the first mode that uses both the multicast radio bearer and the dedicated radio bearer.

8. The method of claim 5, further comprising:
 determining, based on the selected radio bearer mode being the first mode that uses both the multicast radio bearer and the dedicated radio bearer, that the at least one UE is to be in a CONNECTED mode only state in order to receive the multicast/broadcast traffic.

9. The method of claim 5, further comprising:
 receiving an indication from the core network that the at least one UE is to be in a CONNECTED mode only state in order to receive the multicast/broadcast traffic.

10. The method of claim 5, further comprising:
 transmitting a wake up message to trigger the at least one UE to transition to a CONNECTED mode state in order to receive the multicast/broadcast traffic, wherein the wake up message is a per multicast/broadcast quality of service flow message.

11. The method of claim 5, further comprising:
 transmitting a broadcast page to trigger the at least one UE to transition to a CONNECTED mode in order to receive the multicast/broadcast traffic.

12. The method of claim 5, further comprising:
 transmitting a service announcement to the at least one UE in a multicast/broadcast service area via a multicast control channel in order to trigger the at least one UE to transition to a CONNECTED mode in order to receive the multicast/broadcast traffic.

13. The method of claim 5, further comprising:
 receiving, from a UE of the at least one UE, a hybrid automatic repeat request (HARQ) feedback associated with the multicast/broadcast traffic.

14. The method of claim 13, further comprising:
 determining, based at least in part on the HARQ feedback, that the multicast/broadcast traffic is to be retransmitted to the UE;
 determining to use a radio bearer of the multicast radio bearer and the dedicated radio bearer for retransmitting the multicast/broadcast traffic to the UE; and
 retransmitting the multicast/broadcast traffic to the UE using the determined radio bearer.

15. The method of claim 14, further comprising:
 switching, based at least in part on the selected radio bearer mode being the first mode, from use of the multicast radio bearer to the dedicated radio bearer or from use of the dedicated radio bearer to the multicast radio bearer for retransmission of the multicast/broadcast traffic to the UE.

16. The method of claim 14, further comprising:
 indicating to the UE that retransmission of the multicast/broadcast traffic is to be via a different type of radio bearer than was used for an initial transmission of the multicast/broadcast traffic.

17. The method of claim 16, wherein:
 indicating to the UE is via either a radio resource control (RRC) message or a media access control (MAC) control element (CE).

18. The method of claim 1, wherein selecting the radio bearer mode comprises:
 identifying that the selected radio bearer mode is the second mode that uses the multicast radio bearer.

19. The method of claim 18, wherein receiving the indication to serve the multicast/broadcast traffic to the one or more UEs comprises:
establishing a multicast/broadcast N3 tunnel with a multicast/broadcast user plane function (UPF) in order to receive the multicast/broadcast traffic from the multicast/broadcast UPF, wherein the multicast/broadcast N3 tunnel is one of multiple multicast/broadcast N3 tunnels for delivery of the multicast/broadcast traffic by the multicast/broadcast UPF within a broadcast service area.

20. The method of claim 19, further comprising:
receiving an indication from the core network that the multicast/broadcast N3 tunnel is for the second mode that uses the multicast radio bearer.

21. The method of claim 18, further comprising:
transmitting the multicast/broadcast traffic to the at least one UE using a multicast/broadcast transmission based at least in part on the selected radio bearer mode being the second mode that uses the multicast radio bearer.

22. The method of claim 18, further comprising:
determining, based on the selected radio bearer mode being the second mode that uses the multicast radio bearer, that the at least one UE is to be in any of an IDLE, INACTIVE, or CONNECTED mode state in order to receive the multicast/broadcast traffic.

23. The method of claim 18, further comprising:
receiving an indication from the core network that the one or more UEs are to be in any of an IDLE, INACTIVE, or CONNECTED mode state in order to receive the multicast/broadcast traffic.

24. The method of claim 18, further comprising:
configuring, via non-UE specific signaling on a multicast control channel message, the multicast radio bearer to carry the multicast/broadcast traffic to the at least one UE.

25. The method of claim 18, wherein transmitting the multicast/broadcast traffic to the at least one UE comprises:
improving a receive quality of the multicast/broadcast traffic when a UE of the at least one UE is in an IDLE mode state, wherein the receive quality is improved using at least one of a lower modulation and coding scheme or a higher redundancy level with respect to transmissions where the at least one UE is in a CONNECTED mode state.

26. The method of claim 18, further comprising:
receiving, from only UEs in a CONNECTED mode state of the at least one UE, at least one of a hybrid automatic repeat request (HARD) feedback associated with the multicast/broadcast traffic or a channel state information report;
determining, based at least in part on the HARQ feedback, that the multicast/broadcast traffic is to be retransmitted to a UE in the CONNECTED mode state; and
retransmitting the multicast/broadcast traffic to the UE using a unicast transmission mode.

27. A network device for wireless communication, comprising:
a processor,
memory coupled with the processor; and
instructions stored in the memory and executable by the processor to cause the network device to:
receive, at the network device, an indication from a core network to serve multicast/broadcast traffic to one or more user equipment (UEs);
select a radio bearer mode from a first mode that uses both a multicast radio bearer and a dedicated radio bearer and a second mode that uses the multicast radio bearer for delivery of the multicast/broadcast traffic to at least one UE of the one or more UEs, wherein the selecting is based at least in part on the indication; and
transmit the multicast/broadcast traffic to the at least one UE using the selected radio bearer mode.

28. A network device for wireless communication, comprising:
means for receiving, at the network device, an indication from a core network to serve multicast/broadcast traffic to one or more user equipment (UEs);
means for selecting a radio bearer mode from a first mode that uses both a multicast radio bearer and a dedicated radio bearer and a second mode that uses the multicast radio bearer for delivery of the multicast/broadcast traffic to at least one UE of the one or more UEs, wherein the selecting is based at least in part on the indication; and
means for transmitting the multicast traffic to the at least one UE using the selected radio bearer mode.

29. A non-transitory computer-readable medium storing code for wireless communication at a network device, the code comprising instructions executable by a processor to:
receive, at the network device, an indication from a core network to serve multicast/broadcast traffic to one or more user equipment (UEs);
select a radio bearer mode from a first mode that uses both a multicast radio bearer and a dedicated radio bearer and a second mode that uses the multicast radio bearer for delivery of the multicast/broadcast traffic to at least one UE of the one or more UEs, wherein the selecting is based at least in part on the indication; and
transmit the multicast/broadcast traffic to the at least one UE using the selected radio bearer mode.

* * * * *